United States Patent
Sakuda et al.

(10) Patent No.: US 10,269,465 B2
(45) Date of Patent: Apr. 23, 2019

(54) AMORPHOUS (LITHIUM) NIOBIUM SULFIDE OR (LITHIUM) TITANIUM NIOBIUM SULFIDE

(71) Applicant: National Institute of Advanced Industrial Science and Technology, Chiyoda-ku, Tokyo (JP)

(72) Inventors: Atsushi Sakuda, Ikeda (JP); Tomonari Takeuchi, Ikeda (JP); Noboru Taguchi, Ikeda (JP); Hikari Sakaebe, Ikeda (JP); Kuniaki Tatsumi, Ikeda (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 13 days.

(21) Appl. No.: 15/026,329

(22) PCT Filed: Sep. 17, 2014

(86) PCT No.: PCT/JP2014/074543
§ 371 (c)(1),
(2) Date: Jun. 30, 2016

(87) PCT Pub. No.: WO2015/049986
PCT Pub. Date: Apr. 9, 2015

(65) Prior Publication Data
US 2016/0308210 A1  Oct. 20, 2016

(30) Foreign Application Priority Data

Oct. 4, 2013 (JP) ................. 2013-209212

(51) Int. Cl.
*H01B 1/10* (2006.01)
*C01G 23/00* (2006.01)
*C01G 33/00* (2006.01)
*H01M 4/136* (2010.01)
*H01M 4/58* (2010.01)
*H01M 10/0525* (2010.01)
*H01M 10/052* (2010.01)
*H01M 4/02* (2006.01)

(52) U.S. Cl.
CPC ............ *H01B 1/10* (2013.01); *C01G 23/002* (2013.01); *C01G 23/007* (2013.01); *C01G 33/00* (2013.01); *C01G 33/006* (2013.01); *H01M 4/136* (2013.01); *H01M 4/5815* (2013.01); *H01M 10/0525* (2013.01); *C01P 2002/02* (2013.01); *C01P 2002/60* (2013.01); *C01P 2002/72* (2013.01); *C01P 2002/88* (2013.01); *C01P 2004/04* (2013.01); *C01P 2006/40* (2013.01); *C01P 2006/80* (2013.01); *H01M 10/052* (2013.01); *H01M 2004/028* (2013.01)

(58) Field of Classification Search
CPC .......... H01B 1/10; H01M 4/136; H01M 4/58; H01M 4/581; H01M 4/5815; H01M 10/052; H01M 10/0525; C01G 33/00; C01G 33/006; C01G 23/002; C01G 23/007; C01P 2002/02; C01P 2002/04; C01P 2002/60; C01P 2002/72; C01P 2002/88; C01P 2006/40; C01P 2006/80
See application file for complete search history.

(56) References Cited

U.S. PATENT DOCUMENTS

| | | | | |
|---|---|---|---|---|
| 4,263,377 A * | 4/1981 | Joshi | ....... | H01M 4/36 429/231.5 |
| 4,299,892 A * | 11/1981 | Dines | ....... | B82Y 30/00 423/508 |
| 4,542,009 A * | 9/1985 | Palmer | ....... | C01G 1/12 148/239 |
| 5,919,587 A * | 7/1999 | Mukherjee | ....... | H01B 1/12 429/213 |
| 6,207,327 B1 * | 3/2001 | Takada | ....... | H01B 1/10 429/221 |
| 2004/0018141 A1 | 1/2004 | Ritchie et al. | | |
| 2006/0127770 A1 | 6/2006 | Fujiwara | | |
| 2008/0070120 A1 * | 3/2008 | Miyawaki | ....... | H01M 4/134 429/231.95 |
| 2013/0097854 A1 | 4/2013 | Kato et al. | | |

FOREIGN PATENT DOCUMENTS

| CN | 102153720 | 8/2011 | |
|---|---|---|---|
| CN | 102959646 | 3/2013 | |
| JP | 62259348 A * | 11/1987 | ............ H01M 4/581 |
| JP | 2006-236993 | 9/2006 | |

OTHER PUBLICATIONS

English machine translation of JP 62259348 A (1987).*
(Continued)

*Primary Examiner* — Harold Y Pyon
*Assistant Examiner* — Matthew R Diaz
(74) *Attorney, Agent, or Firm* — McCarter & English, LLP

(57) ABSTRACT

The sulfide of the present invention comprises an amorphous (lithium) niobium sulfide having an average composition represented by formula (1): $Li_{k1}NbS_{n1}$ (wherein $0 \le k1 \le 5$; $3 \le n1 \le 10$; and when $n1 \ge 3.5$, $k1 \le 0.5$), or an amorphous (lithium) titanium niobium sulfide having an average composition represented by formula (2): $Li_{k2}Ti_{1-m2}Nb_{m2}S_{n2}$ (wherein $0 \le k2 \le 5$; $0 < m2 < 1$; $2 \le n2 \le 10$; and when $n2 \ge 3.5$, $k2 \le 1.5$). The sulfide of the present invention is a material that is useful as a cathode active material for lithium batteries, such as lithium primary batteries, lithium secondary batteries, and lithium ion secondary batteries, and has a high charge-discharge capacity, high electrical conductivity, and excellent charge-discharge performance.

20 Claims, 23 Drawing Sheets

(56) References Cited

OTHER PUBLICATIONS

Sourisseau, C., et al., "Structural and Vibrational Studies of LixNbS3 Intercalated Compounds ($0 < x \leq 3$)", European Journal of Solid State and Inorganic Chemistry, vol. 29, pp. 111-130.

Bensalem, A., et al., "Low Temperature Preparation of Amorphous Niobium Sulfide", Materials Research Bulletin, 1990, vol. 25, pp. 349-356.

Whittingham, M. Stanley, "The Role of Ternary Phases in Cathode Reactions", Journal of the Electrochemical Society, Mar. 1976, vol. 123, No. 3, pp. 315-320.

Lindic, M.H., et al., "XPS Investigations of TiOySz Amorphous Thin Films Used as Positive Electrode in Lithium Microbatteries", Solid State Ionics, 2005, vol. 176, pp. 1529-1537.

Matsuyama, Takuya, et al., "Preparation of Amorphous TiSx Thin Film Electrodes by the PLD Method and Their Application to All-Solid-State Lithium Secondary Batteries", Journal of Materials Science, 2012, vol. 47, pp. 6601-6606.

Hayashi, Akitoshi, et al., "Amorphous Titanium Sulfide Electrode for All-Solid-State Rechargeable Lithium Batteries with High Capacity", Chemistry Letters, 2012, vol. 41, pp. 886-888.

Sakuda, Atsushi, et al., "Amorphous TiS4 Positive Electrode for Lithium-Sulfur Secondary Batteries", Electrochemistry Communications, 2013, vol. 31, pp. 71-75.

International Search Report of International Application No. PCT/JP2014/074543, dated Dec. 2, 2014, 1 Page.

Kumagai, Naoaki, et al., "Charge-Discharge Characteristics and Structural Change in Various Niobium Sulfide Cathodes for Lithium-Nonaqueous Secondary Batteries", Electrochimica Acta, Aug. 1, 1982, vol. 27, No. 8, pp. 1087-1092.

Matsuyama, Takuya, et al., "Electrochemical Properties of All-Solid-State Lithium Batteries with Amorphous Titanium Sulfide Electrodes Prepared by Mechanical Milling", Journal of Solid State Electrochemistry, Jul. 2013, vol. 17, No. 10, pp. 2697-2701.

European Search Report based on co-pending European Patent Application No. 14850200, dated Mar. 24, 2017, 8 Pages.

Office Action dated Nov. 7, 2016 relating to co-pending Chinese Application No. 201480050196.3 (Machine Translation)—8 Pages.

* cited by examiner

[Fig. 1]
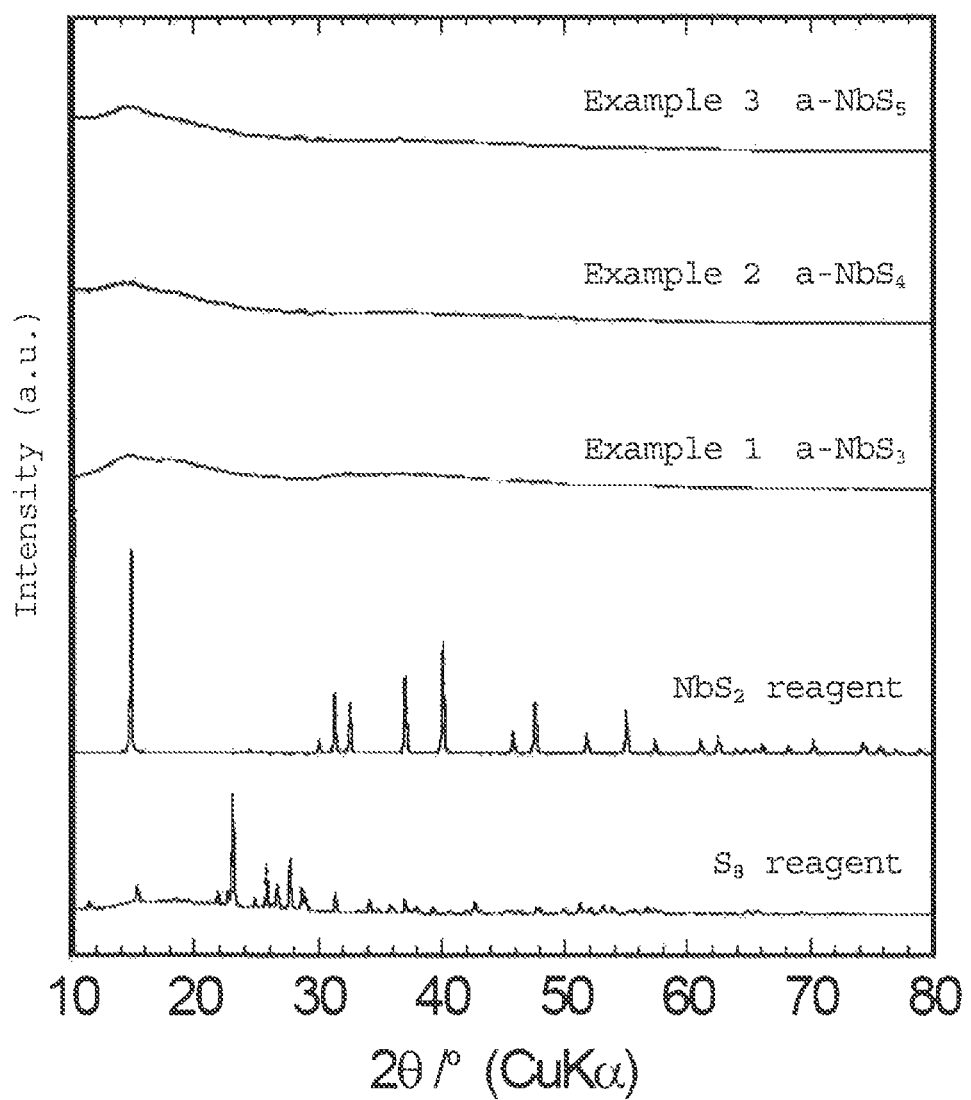

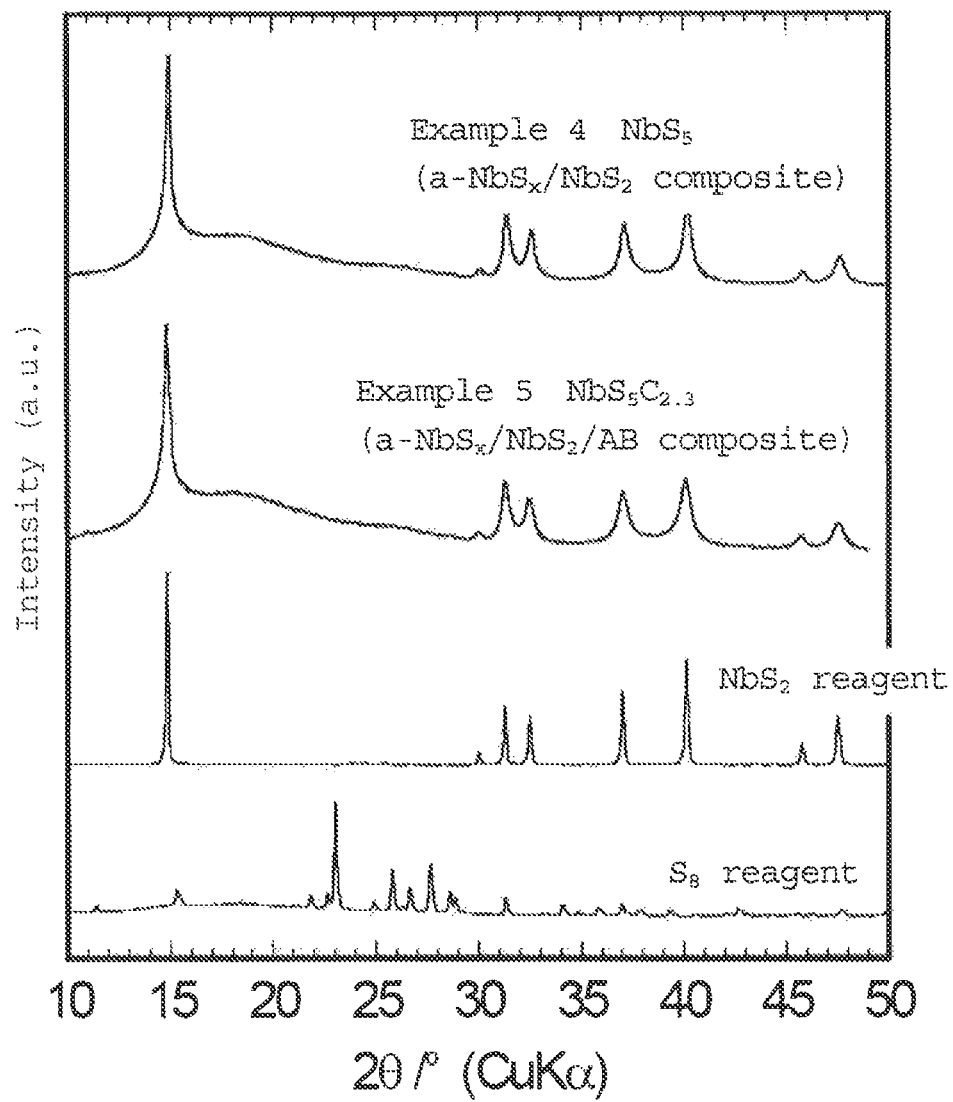
[Fig. 2]

[Fig. 3]
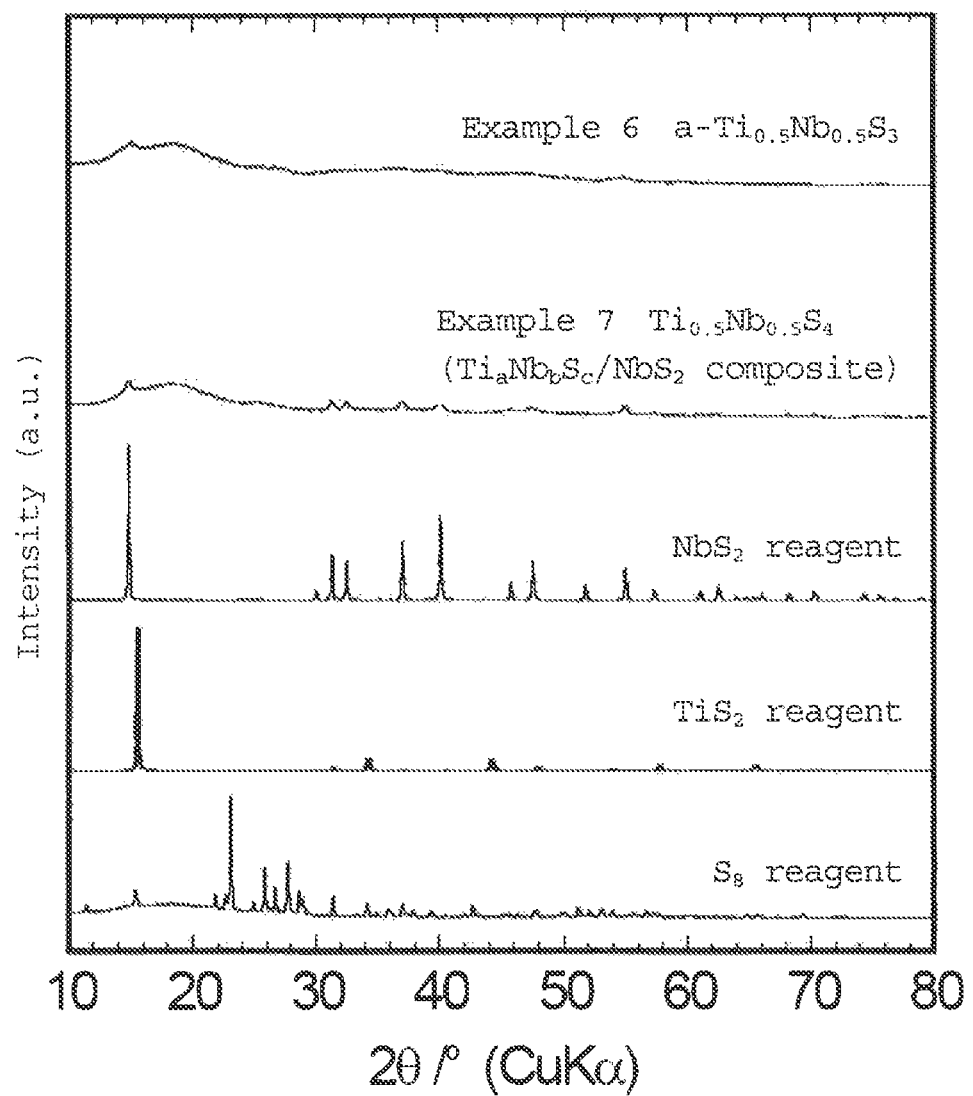

[Fig. 4]
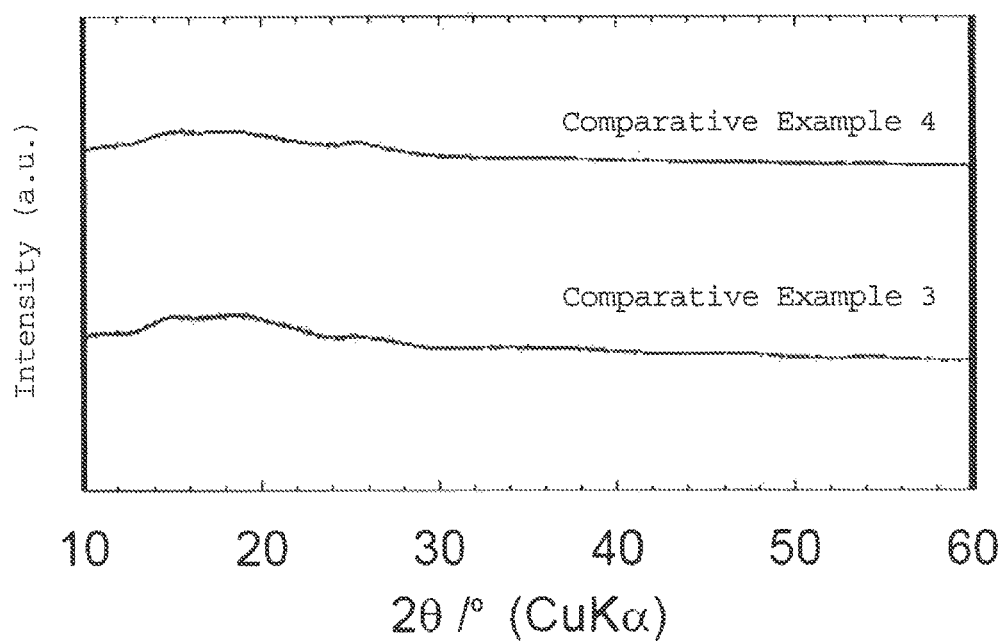

[Fig. 5]
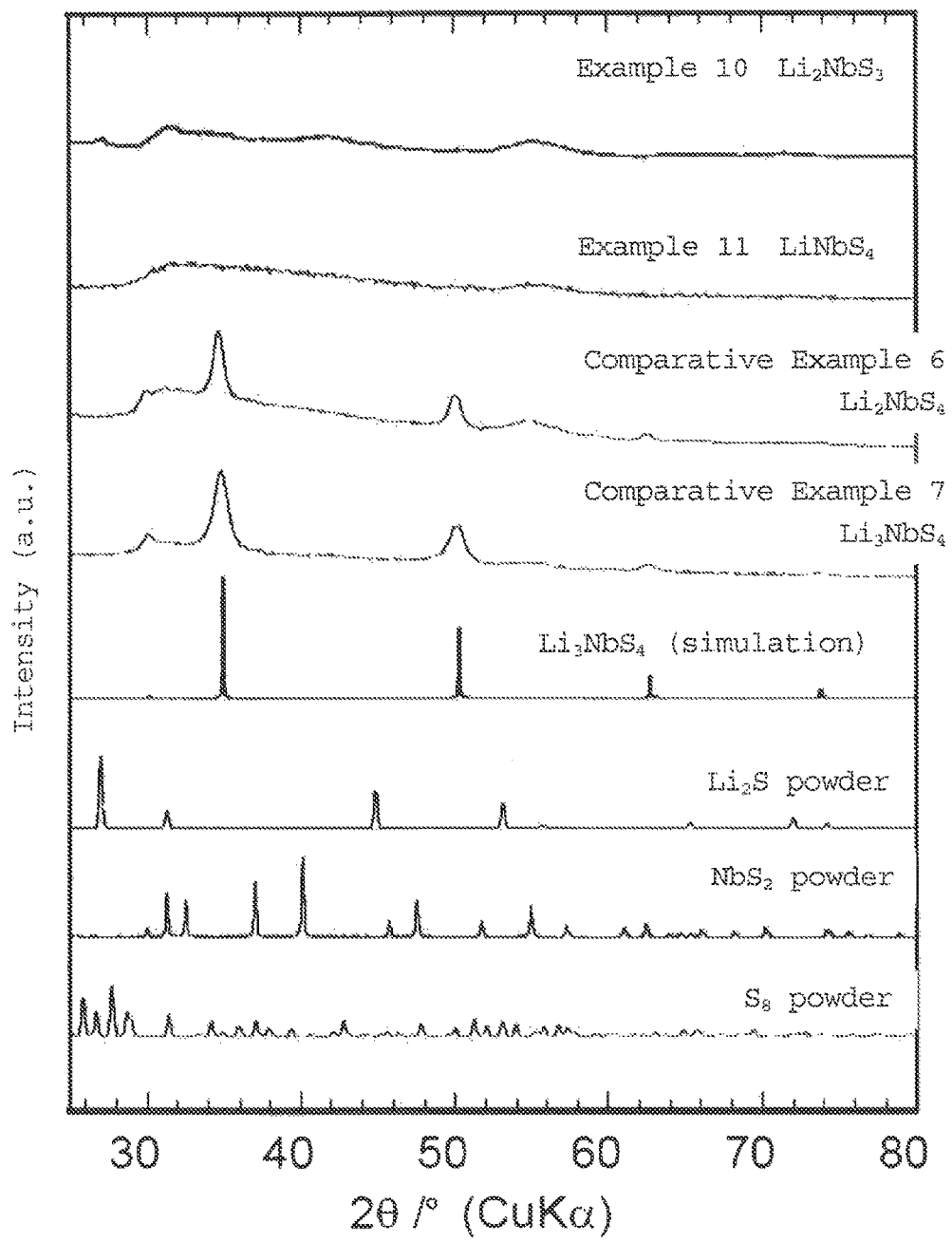

[Fig. 6]
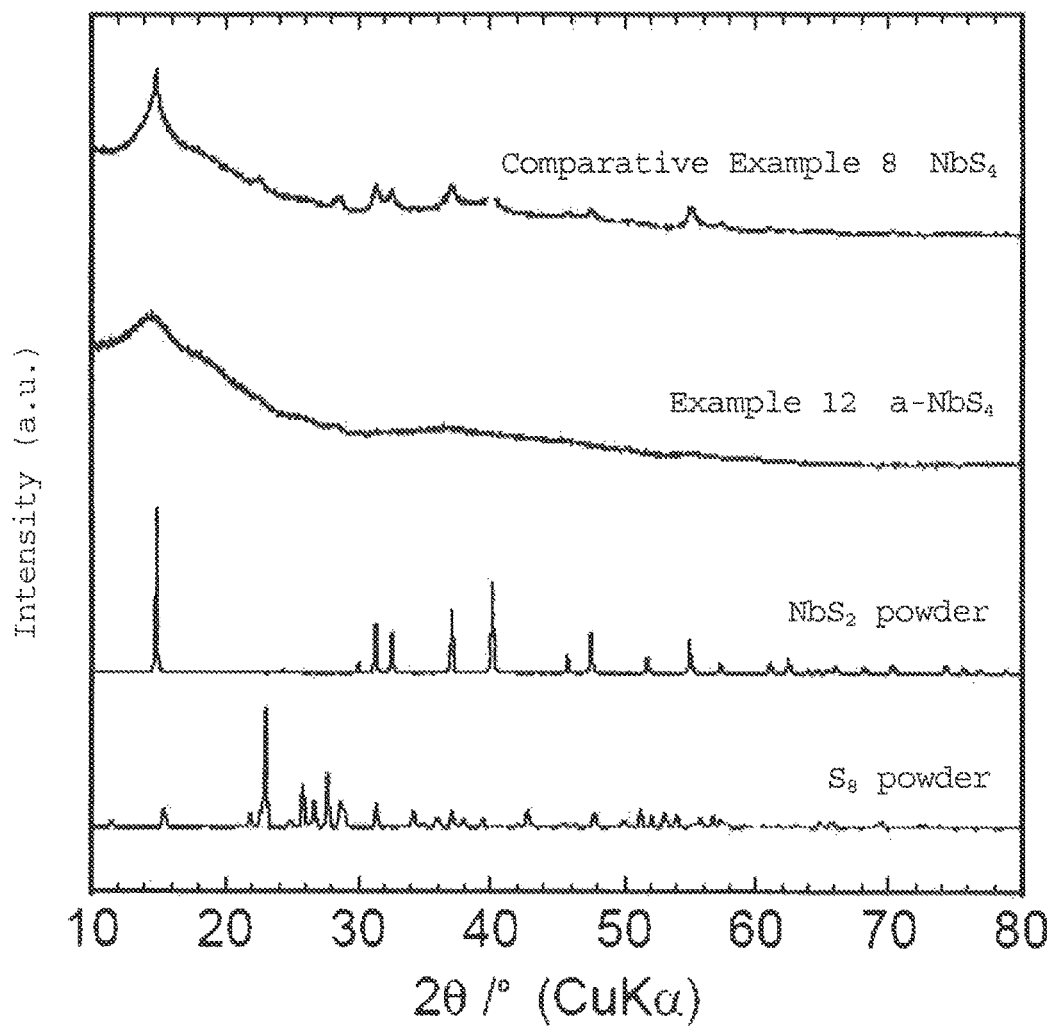

[Fig. 7]
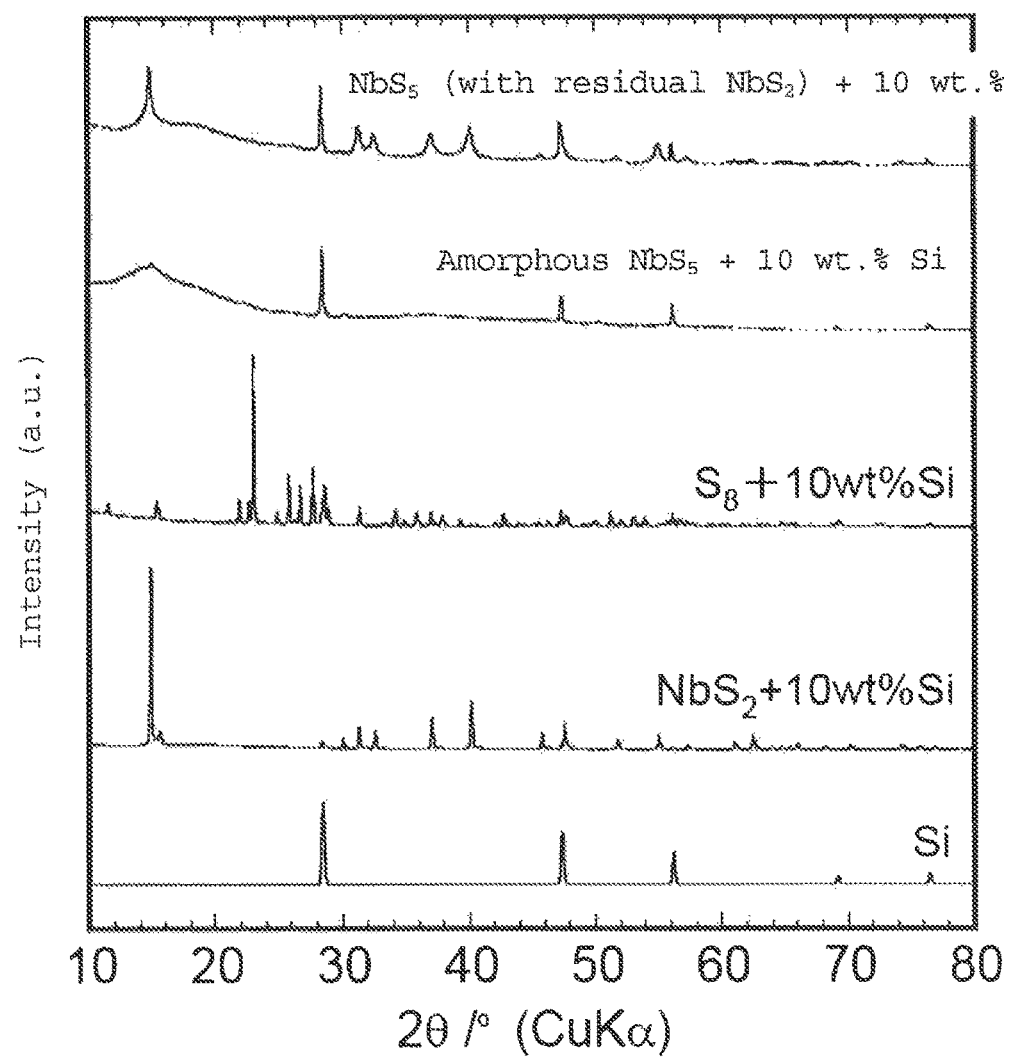

[Fig. 8]
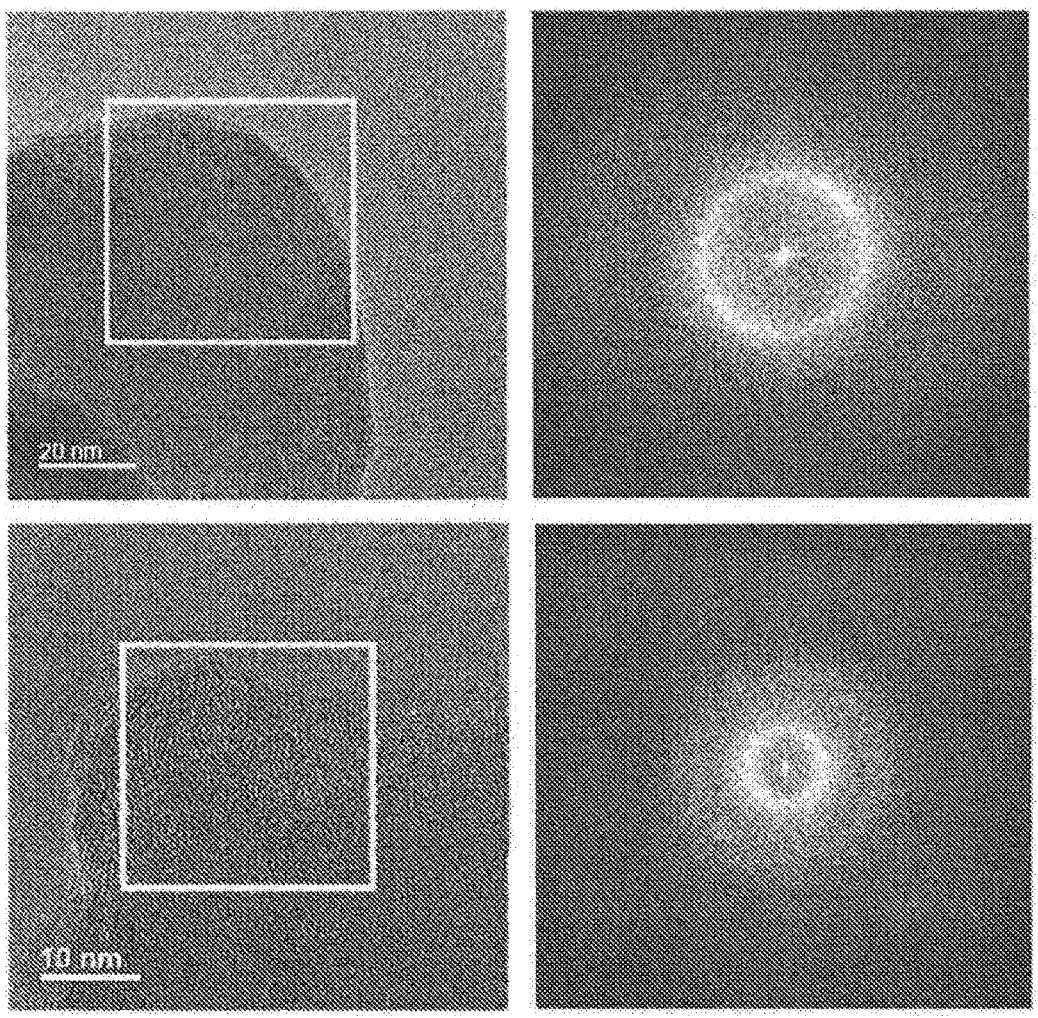

[Fig. 9]
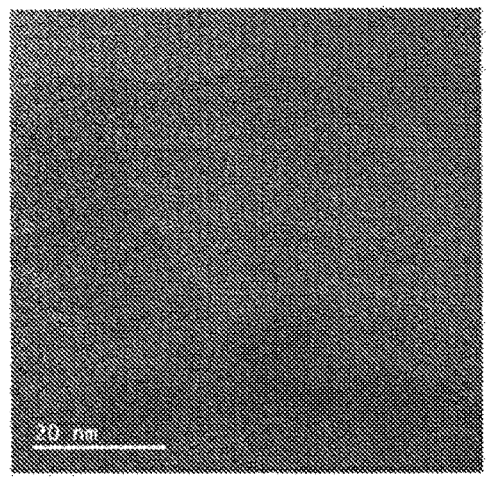
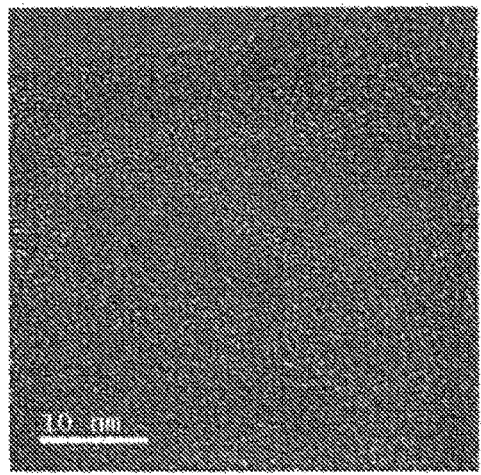
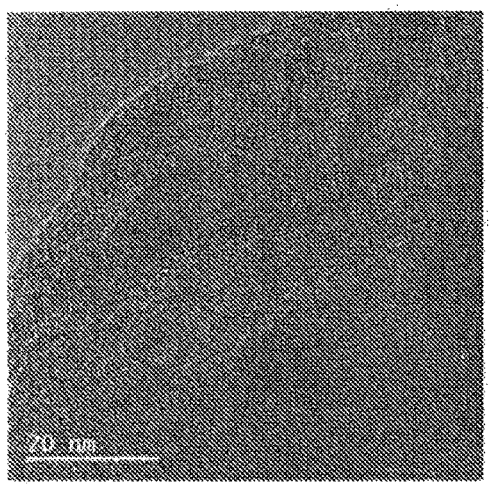
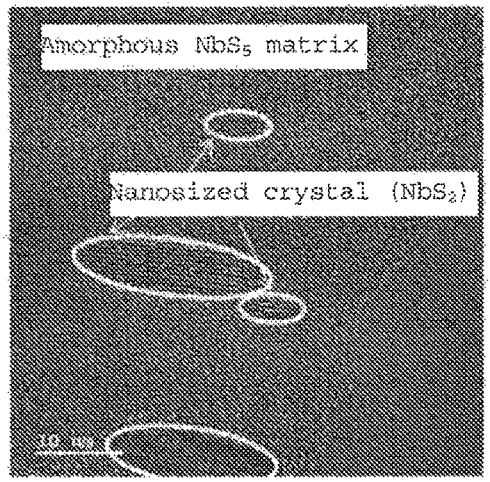

[Fig. 10]
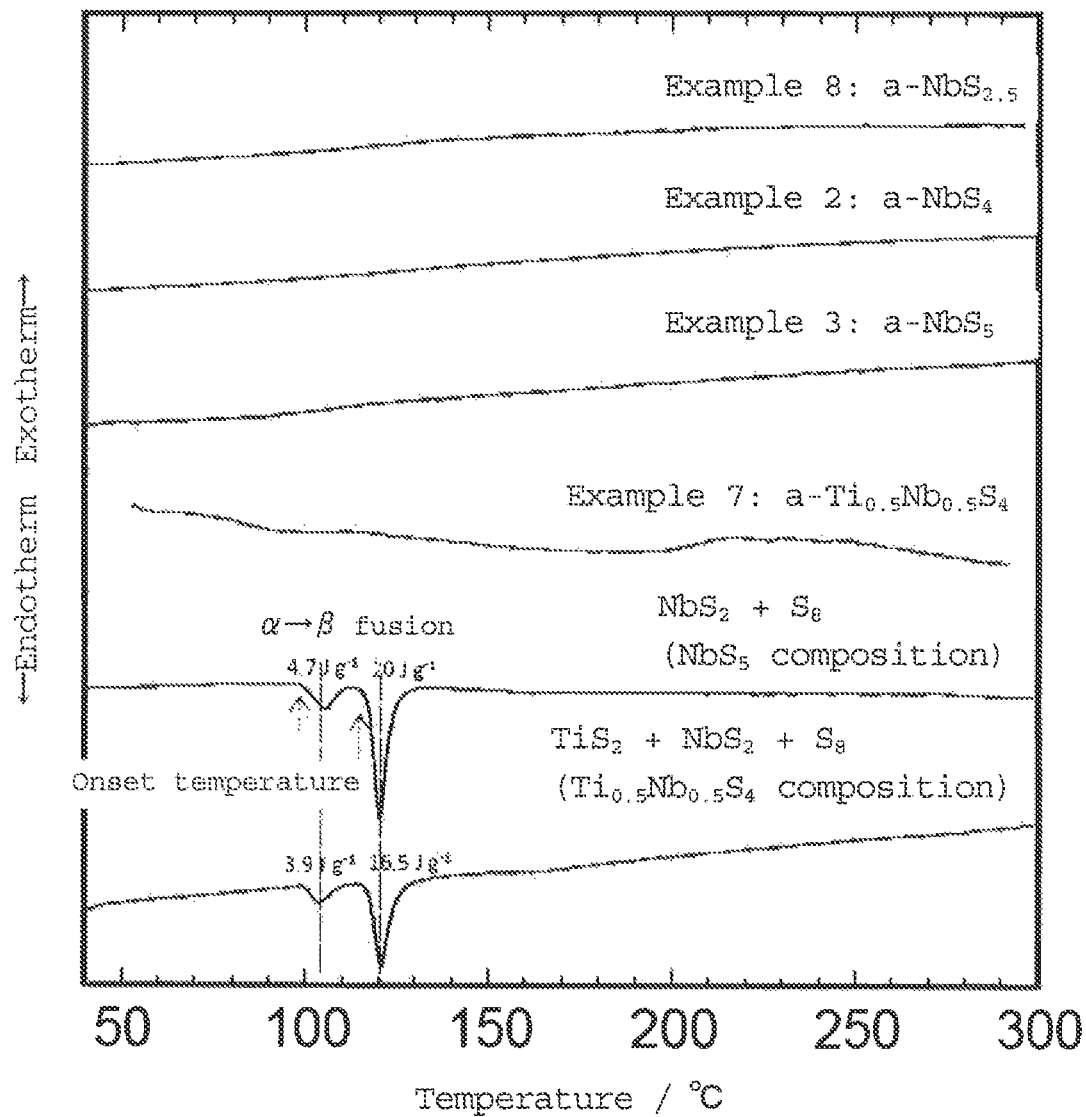

[Fig. 11]
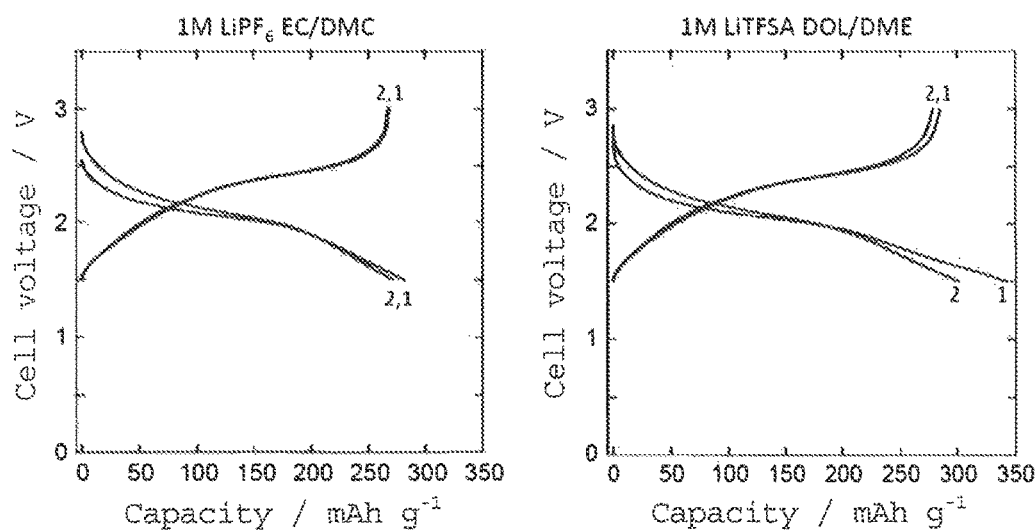
[Fig. 12]
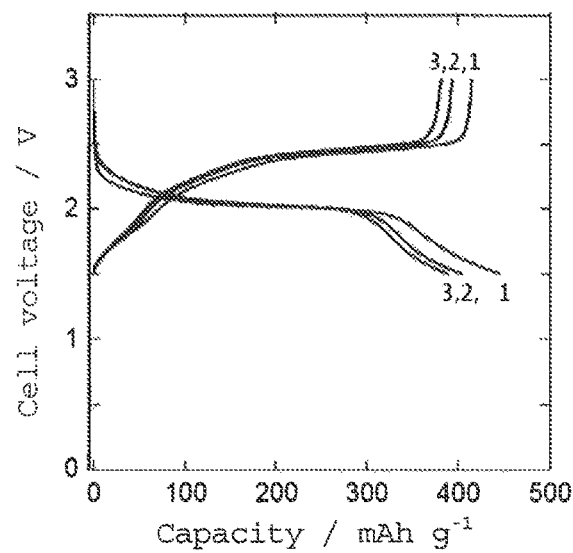

[Fig. 13]
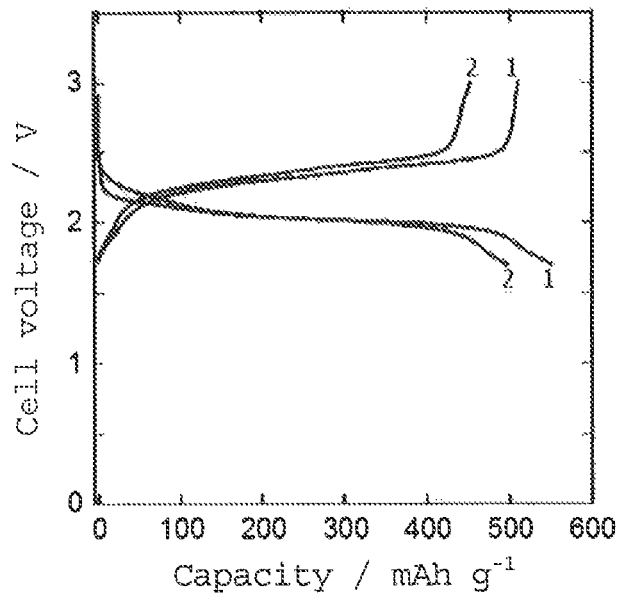
[Fig. 14]
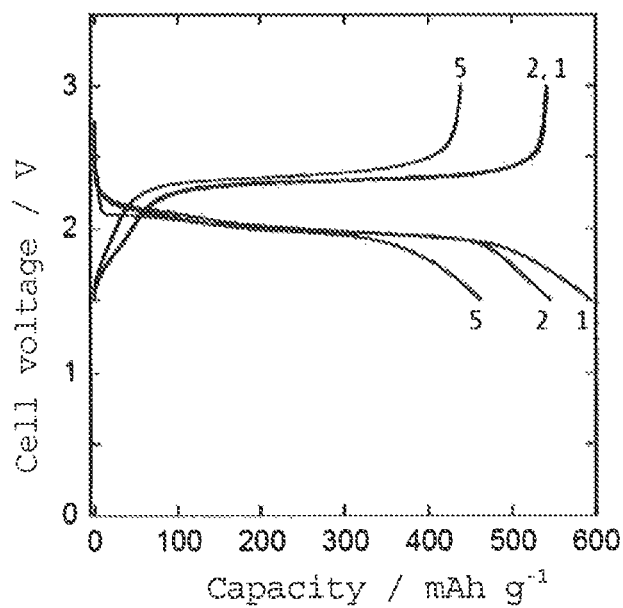

[Fig. 15]
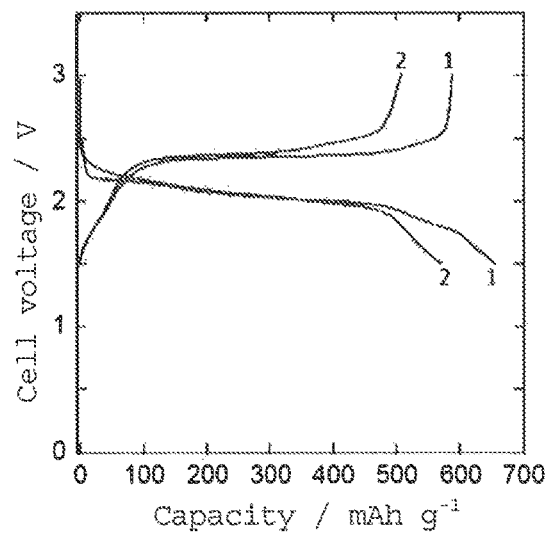
[Fig. 16]
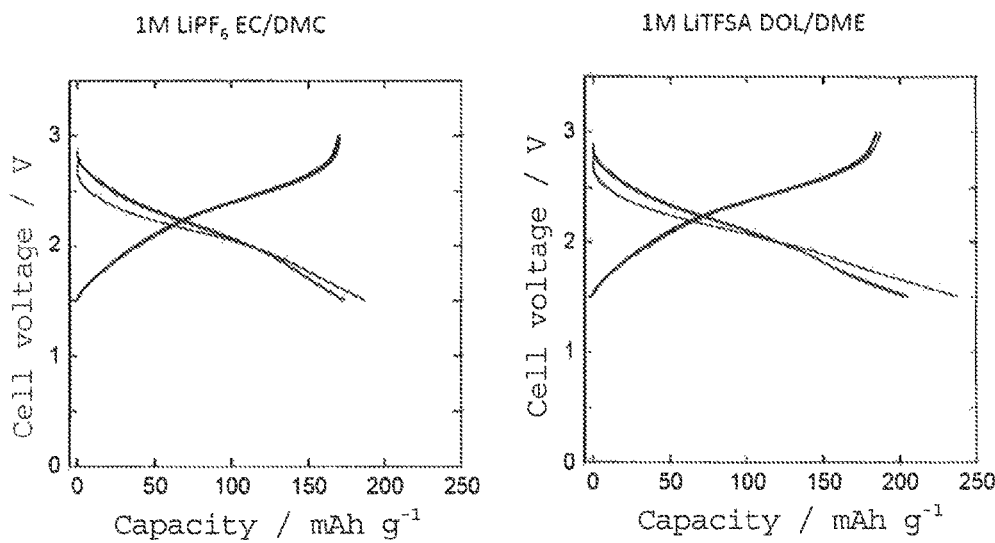

[Fig. 17]
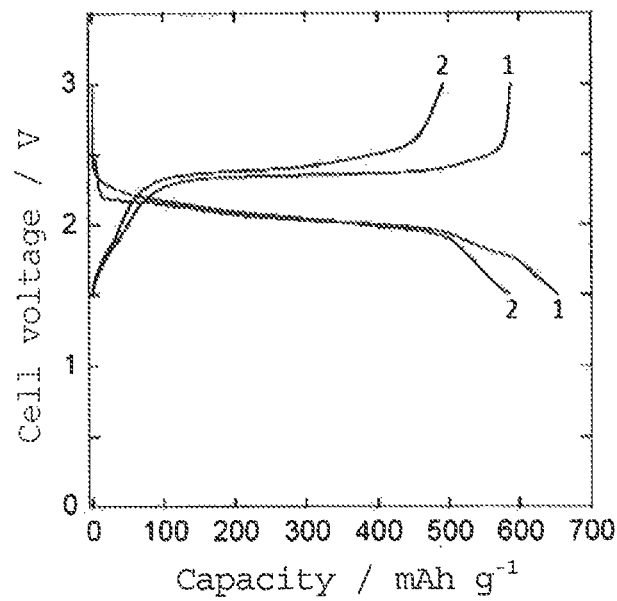
[Fig. 18]
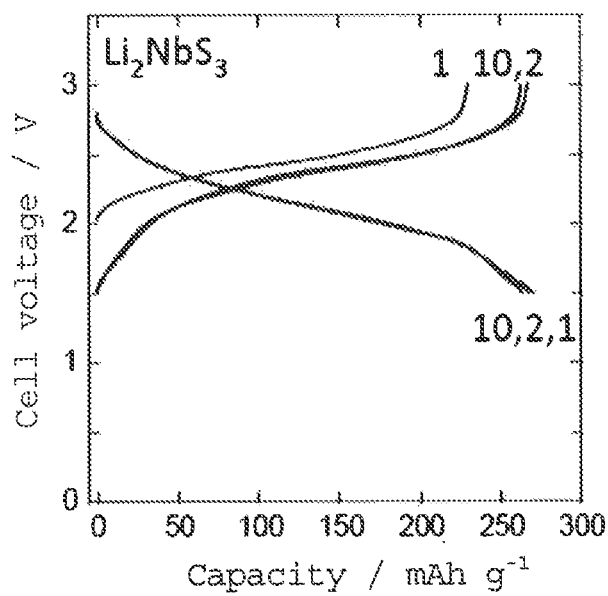

[Fig. 19]
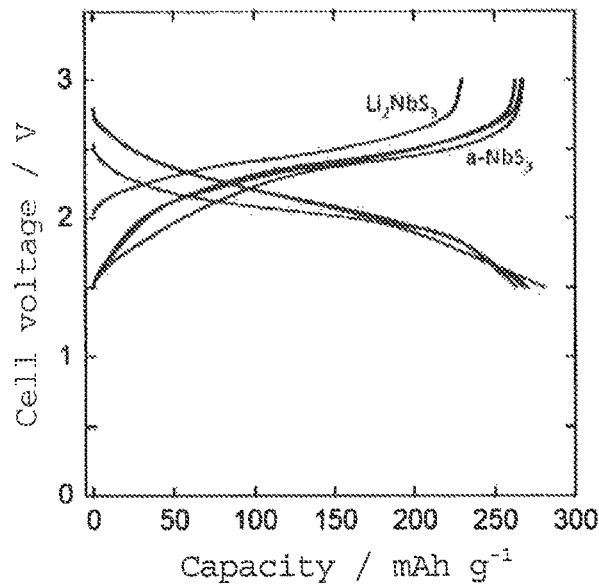
[Fig. 20]
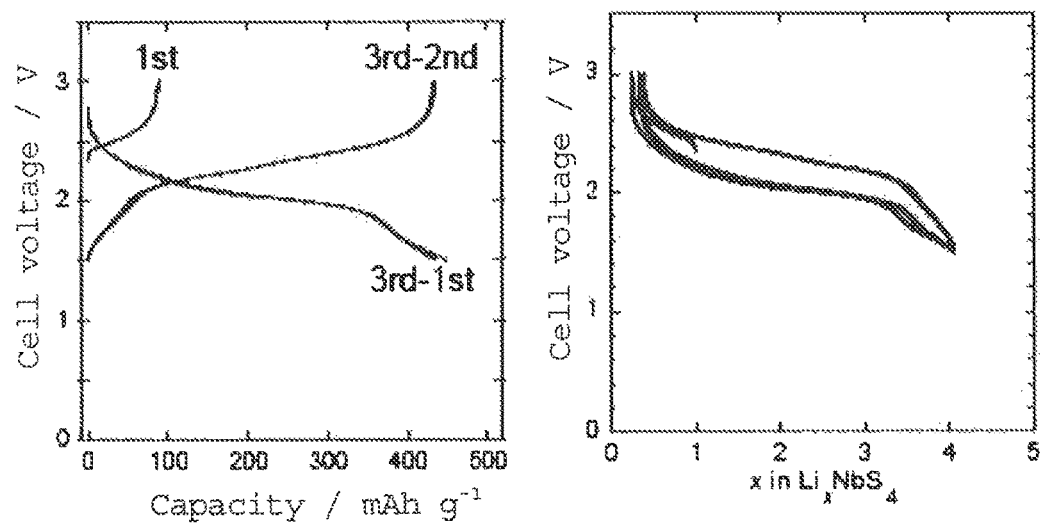

[Fig. 21]
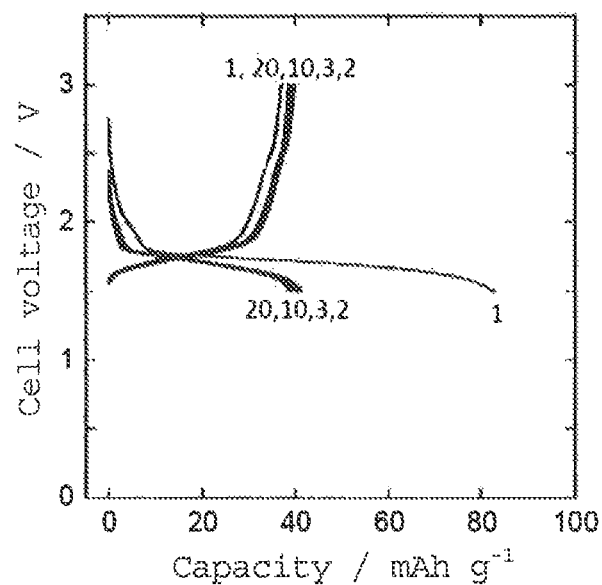
[Fig. 22]
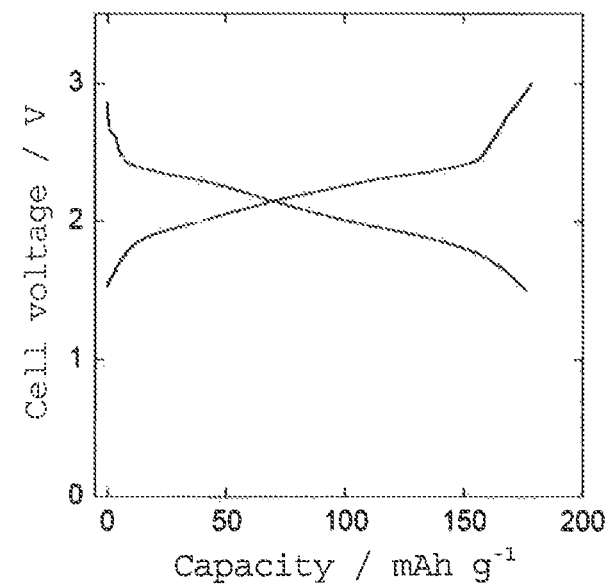

[Fig. 23]
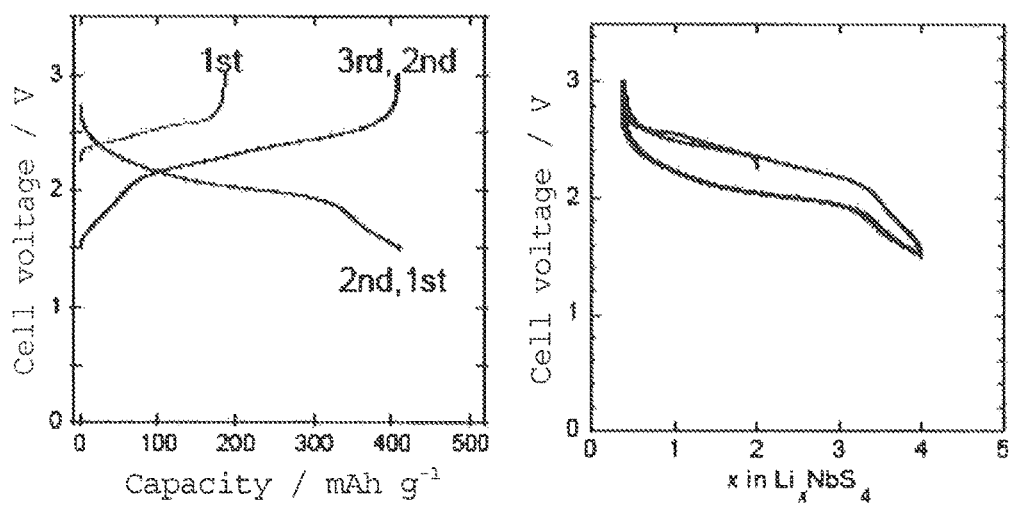
[Fig. 24]
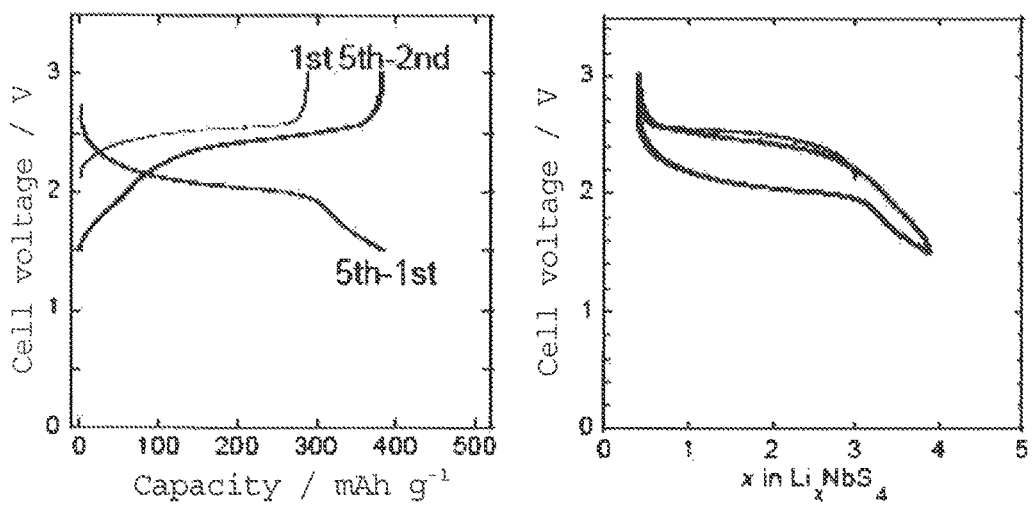

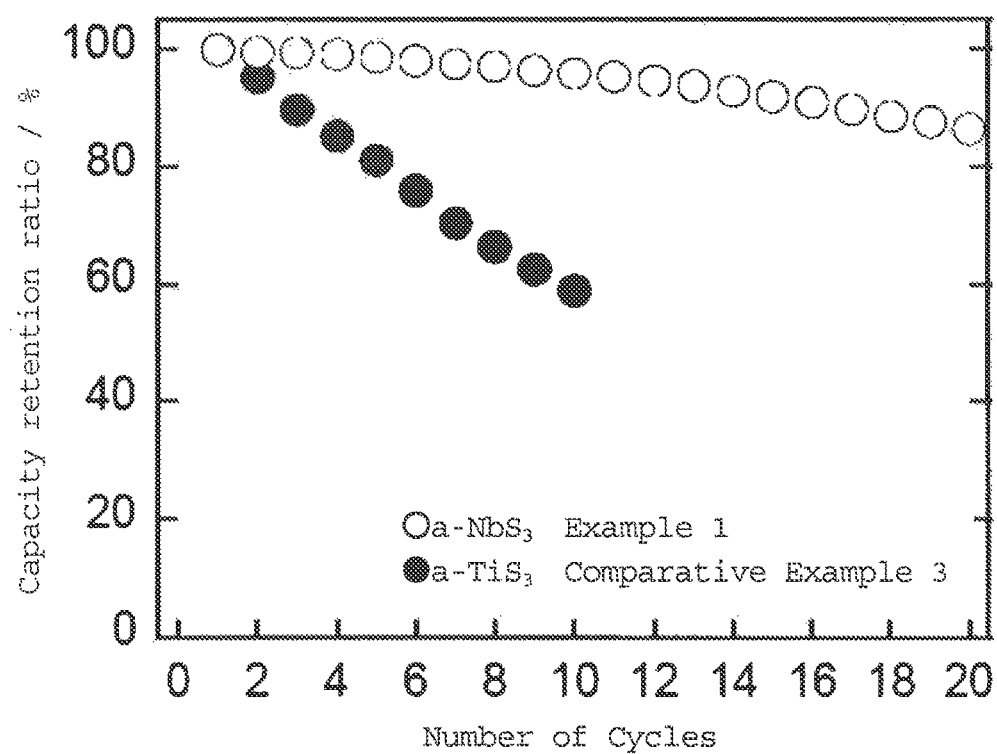
[Fig. 25]

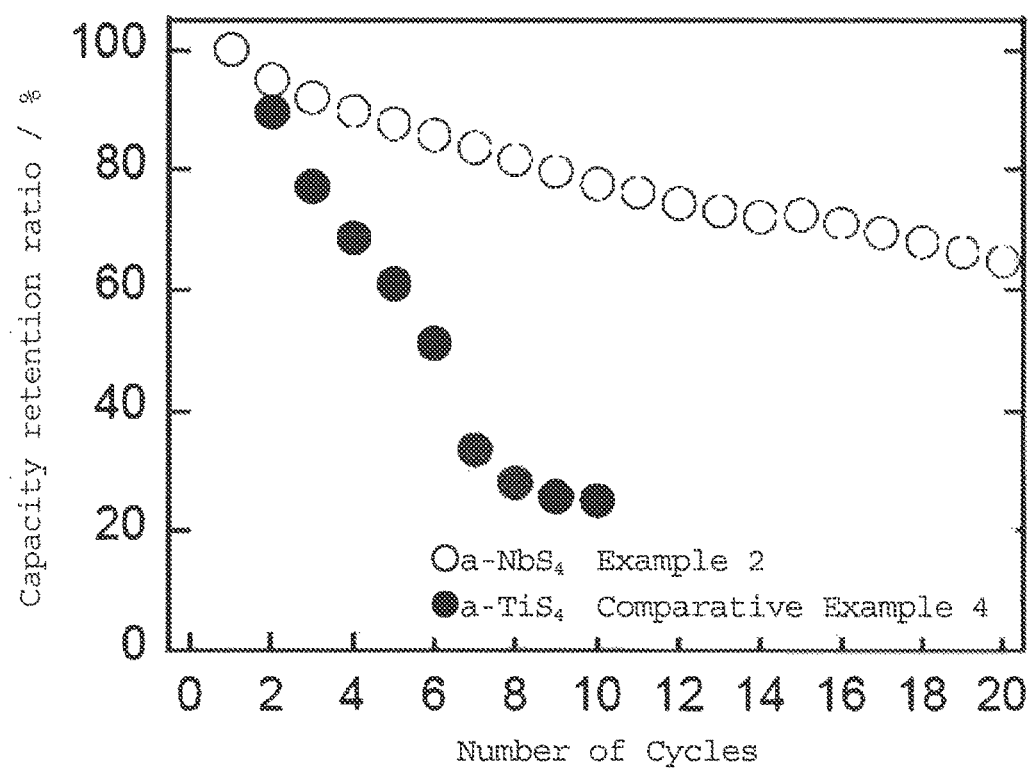
[Fig. 26]

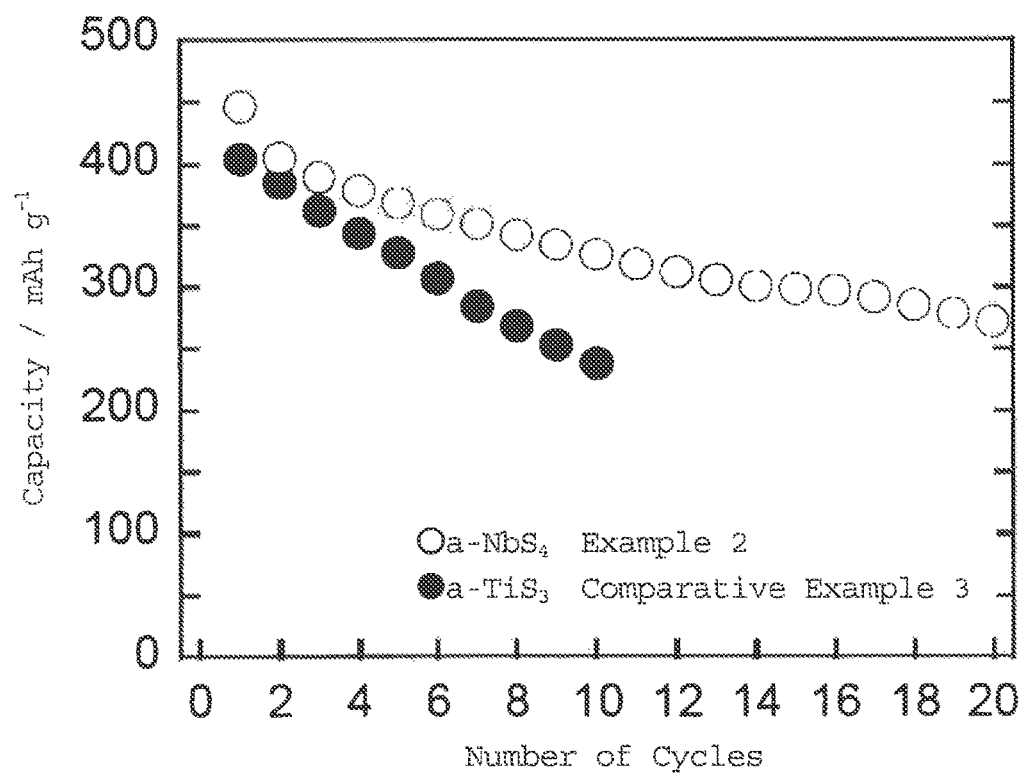
[Fig. 27]

[Fig. 28]
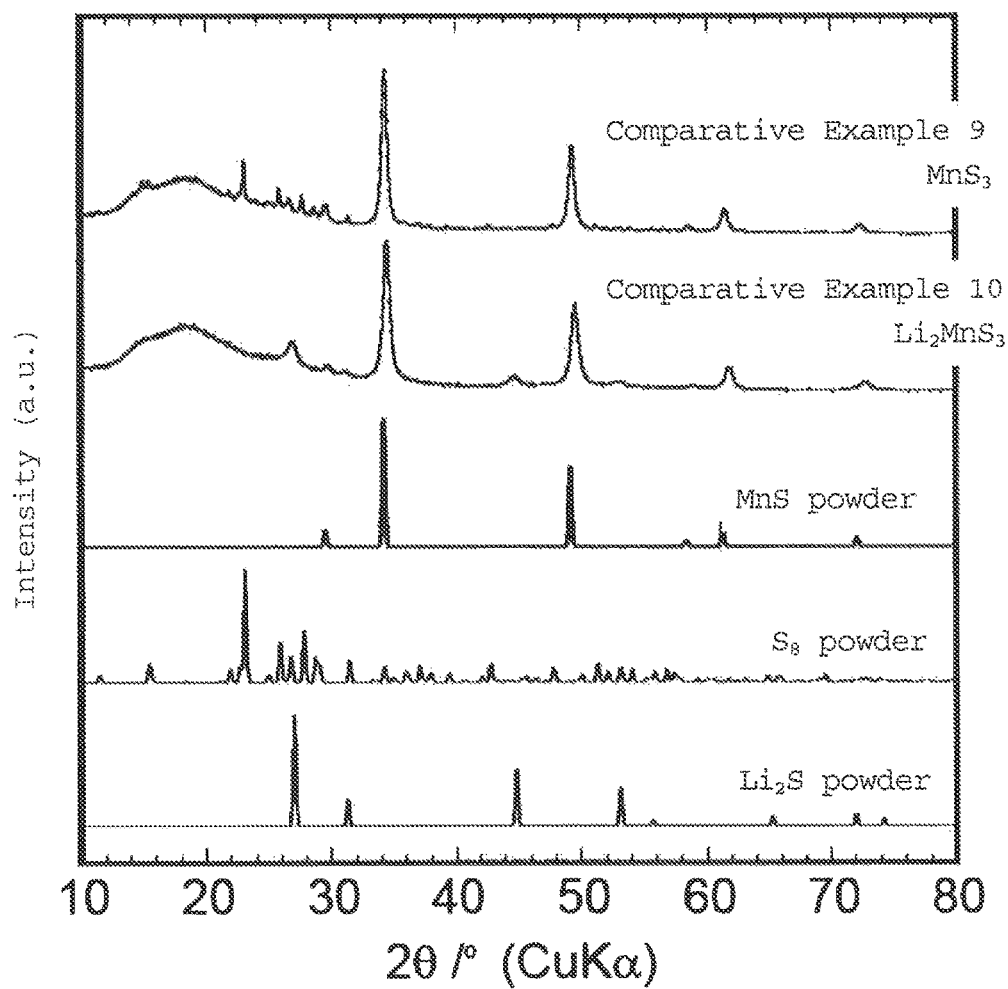

[Fig. 29]
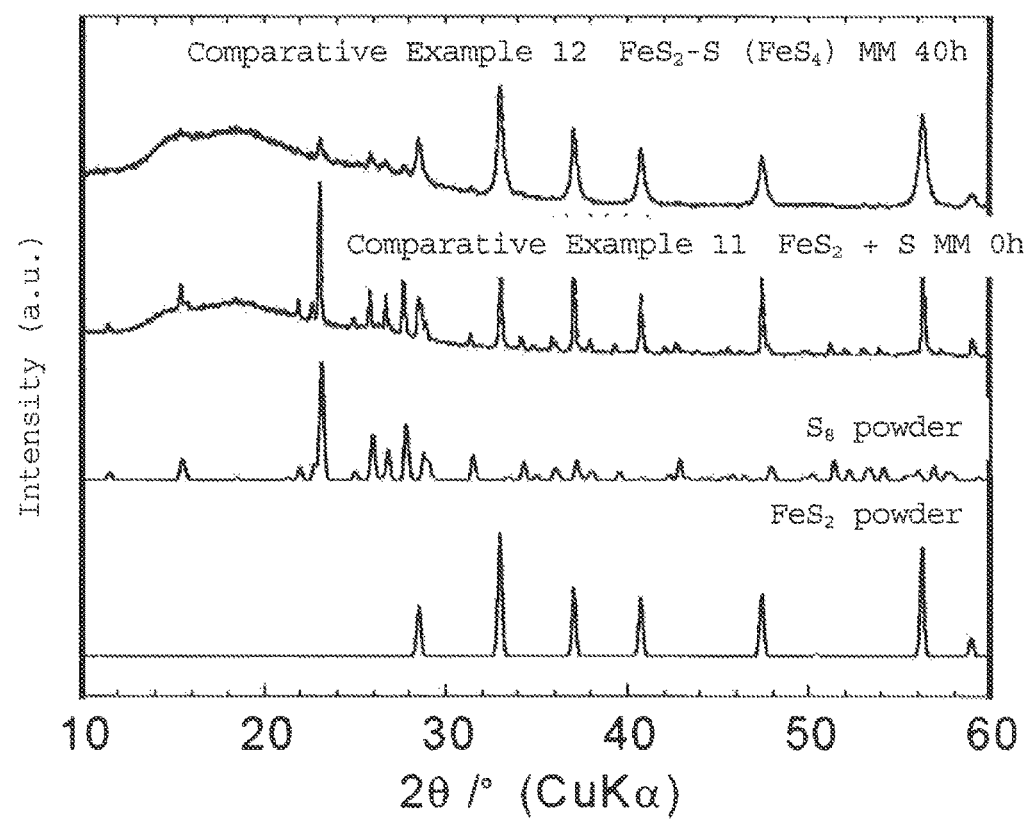

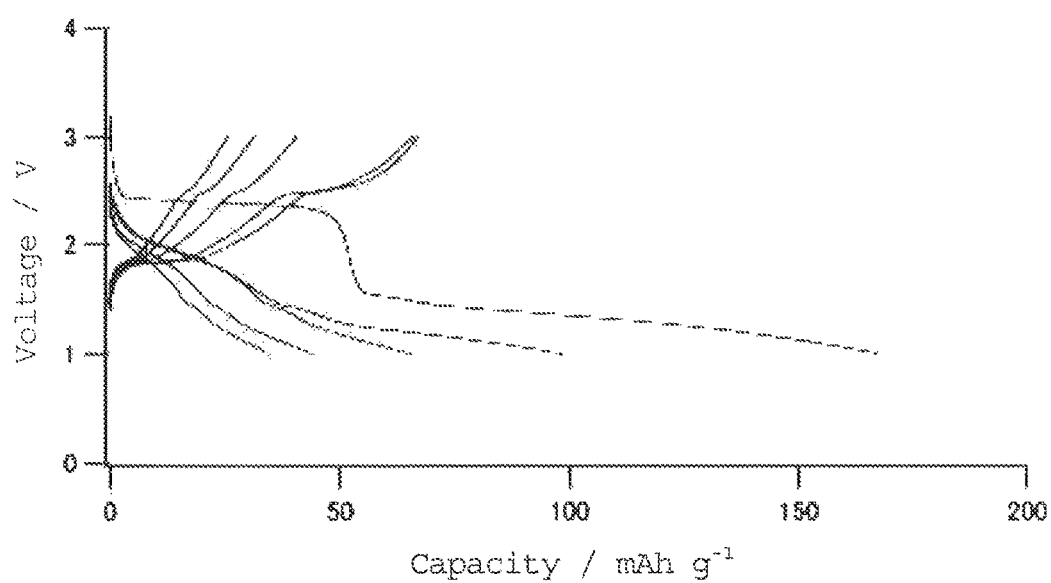
[Fig. 30]

AMORPHOUS (LITHIUM) NIOBIUM SULFIDE OR (LITHIUM) TITANIUM NIOBIUM SULFIDE

CROSS-REFERENCE TO RELATED APPLICATIONS

This application is a national stage application filed under 35 USC 371 of PCT/JP2014/074543, filed Sep. 17, 2014, which claims the benefit of Japanese Patent Application Nos. 2013-209212, filed Oct. 4, 2013, all of which are incorporated herein, in entirety, by reference.

TECHNICAL FIELD

The present invention relates to an amorphous (lithium) niobium sulfide or an amorphous (lithium) titanium niobium sulfide, a method for producing the sulfide, and a lithium battery comprising the sulfide.

BACKGROUND ART

Since portable electronic devices, hybrid vehicles, etc., have had higher performance in recent years, secondary batteries (in particular, lithium primary batteries, lithium secondary batteries, and lithium ion second batteries) used for such devices are increasingly required to have higher capacity. However, for current lithium secondary batteries, the development of higher-capacity cathodes lags behind the development of higher-capacity negative electrodes. Even lithium nickel oxide-based materials, which are said to have a relatively high capacity, have a capacity of only about 190 to 220 mAh/g.

In contrast, sulfur, which has a theoretical capacity of as high as about 1,670 mAh/g, is a promising candidate for a high-capacity cathode material. However, elemental sulfur has low electronic conductivity, as well as problematic elution as lithium polysulfide into an organic electrolyte during charging and discharging. Therefore, a technique for inhibiting elution into an organic electrolyte is essential.

Metal sulfides are electronically conductive, and also have reduced elution into an organic electrolyte. However, metal sulfides have lower theoretical capacities than sulfur, and also have problematically low charge-discharge reversibility due to a great structural change resulting from lithium insertion/extraction during charging and discharging. To increase the capacity of metal sulfide, increasing sulfur content is necessary. However, since the sites of crystalline metal sulfide into which Li can be inserted during discharging are defined by crystal space groups, and this determines the maximum capacity, it is difficult to exceed this maximum capacity value.

For example, with respect to titanium sulfide compounds among metal sulfides, titanium disulfide ($TiS_2$), titanium trisulfide ($TiS_3$), etc., have been studied as crystalline titanium sulfides. Titanium disulfide and titanium trisulfide have been reported to have discharge capacities of about 240 mAh/g and about 350 mAh/g, respectively (Non-patent Literature (NFL) 1 and Non-patent literature (NPL) 2). However, a further increase of the capacity has been desired.

On the other hand, with respect to amorphous titanium sulfide compounds, a report describes that a $TiS_a$ ($0.7 \leq a \leq 9$) thin film was produced by using a pulsed layer deposition (PLD) method, and that an all-solid-state cell was charged or discharged (Non-patent Literature (NPL) 3). Further, other reports describe that when amorphous $TiS_3$ or $TiS_4$ was produced and used as an electrode in an all-solid-state cell, a high capacity (about 400 to 690 mAh/g) was obtained (Non-patent Literature (NPL) 4 and Non-patent Literature (NPL) 5).

CITATION LIST

Non-Patent Literature (NPL)

NFL 1: M. S. Whittingham, J. Electrochem. Soc., 123 (1976) 315-320,
NPL 2: M. H. Lindic et al., Solid State Ionics, 176 (2005) 1529-1537,
NPL 3: T. Matsuyama et al., J. Mater. Sci. 47 (2012) 6601-6606,
NPL 4: A. Hayashi et al., Chem. Lett., 41 (9) (2012) 886-888,
NPL 5: A. Sakuda et al., Electrochem. Commun., 31 (2013) 71-75.

SUMMARY OF INVENTION

Technical Problem

As described above, amorphous titanium sulfide compounds as well as crystalline titanium sulfide compounds have been reported. However, to exhibit sufficient charge-discharge characteristics as electrode materials, not only charge-discharge capacity but also electrical conductivity of electrodes are important.

For example, the electrical conductivity is desirably about $10^{-4}$ s/cm or more at room temperature. However, if sulfur content is increased in order to increase the capacity of a titanium sulfide compound, electrical conductivity is problematically significantly reduced. In this case, due to lack of high-speed charge-discharge characteristics, atomization or thin-film formation is desirable. However, enlargement is difficult to achieve with a thin-film electrode, and its uses are limited. Further, an actual measurement shows that the capacity is not as high as reported, and the capacity cannot be considered to be sufficient.

The present invention was made in view of the above problems in the prior art. A primary object of the present invention is to provide a material that has a high charge-discharge capacity useful as a cathode active material for lithium batteries, such as lithium primary batteries, lithium secondary batteries, and lithium ion second batteries, and also has high electrical conductivity and excellent charge-discharge performance.

Solution to Problem

To achieve the above object, the present inventors carried out extensive research. As a result, the inventors found that when a titanium source, which is a starting material for an amorphous titanium sulfide compound, is partially or entirely replaced with a niobium source, i.e., when a niobium source (e.g., crystalline niobium sulfide) and a sulfur source (e.g., sulfur), optionally with a titanium source (e.g., titanium sulfide), a lithium source (e.g., lithium sulfide), a carbon source (e.g., carbonaceous material), etc., are subjected to mechanical milling, the resulting sulfide is made amorphous, thus obtaining a sulfide with a high sulfur content. This product may be such that a crystalline metal sulfide and/or a carbon-containing material is present in a matrix of amorphous sulfide. The present inventors found that the product obtained by this method has high charge-discharge capacity and high electrical conductivity, and that when the obtained product is used as a cathode active material for lithium batteries, excellent charge-discharge performance (in particular, charge-discharge cycle characteristics) is achieved. The present invention has been accomplished through further research based on the above findings.

Specifically, the present invention includes the following:
Item 1. A sulfide comprising an amorphous (lithium) niobium sulfide having an average composition represented by formula (1):

$$Li_{k1}NbS_{n1}$$

(wherein 0≤k1≤5; 3≤n1≤10; and when n1≥3.5, k1≤1.5), or an amorphous (lithium) titanium niobium sulfide having an average composition represented by formula (2):

$$Li_{k2}Ti_{1-m2}Nb_{m2}S_{n2}$$

(wherein 0≤k2≤5; 0<m2<1; 2≤n2≤10; and when n2≥3.5, k2≤1.5).

Item 2. The sulfide according to Item 1, wherein the sulfide has an impurity concentration of not more than 2 wt. %.
Item 3. A sulfide comprising an amorphous sulfide having an average composition represented by formula (3):

$$Li_{k3}Ti_{1-m3}Nb_{m3}S_{n3}$$

(wherein 0≤k3≤5; 0<m3≤1; 2≤n3≤10; when n3≥3.5, k3≤1.5), the sulfide having an impurity concentration of not more than 2 wt. %.
Item 4. A sulfide comprising the sulfide according to any one of Items 1 to 3 as a matrix, and a crystalline metal sulfide that is present in the matrix.
Item 5. The sulfide according to any one of Items 1 to 4, wherein in an X-ray diffraction diagram obtained using CuKα radiation, the sulfide has a half-width of 0.30 or more at diffraction angles 2θ=15.0±0.5°, 15.5±0.5°, and 23.0±0.5°, or has no diffraction peaks at diffraction angles 2θ=15.0±0.5, 15.5±0.5°, and 23.0±0.5°.
Item 6. The sulfide according to any one of Items 1 to 5, wherein the sulfide contains no crystallites, or has an average crystallite size of 5 nm or less.
Item 7. A sulfide having an average composition represented by formula (4):

$$Li_{k4}Ti_{1-m4}Nb_{m4}S_{n4}C_x$$

(wherein 0≤k4≤5; 0<m4≤1; 2≤n4≤10; 0≤x≤10; when n4≥3.5, k4≤1.5), the sulfide comprising an amorphous (lithium) niobium sulfide or an amorphous (lithium) titanium niobium sulfide as a matrix, and a crystalline metal sulfide or carbon that is present in the matrix.
Item 8. The sulfide according to Item 7, wherein in an X-ray diffraction diagram obtained using CuKα radiation, the amorphous (lithium) niobium sulfide or amorphous (lithium) titanium niobium sulfide has a half-width of 0.3° or more at diffraction angles 2θ=15.0±0.50°, 15.5±0.5°, and 23.0±0.5°, or has no diffraction peaks at diffraction angles 2θ=15.0±0.5°, 15.5±0.5°, and 23.0±0.5°.
Item 9. The sulfide according to Item 7 or 8, wherein the amorphous (lithium) niobium sulfide or amorphous (lithium) titanium niobium sulfide contains no crystallites, or has an average crystallite size of 5 nm or less.
Item 10. A method for producing the sulfide according to any one of Items 1 to 9, the method using a niobium-containing material and a sulfur-containing material as starting materials or intermediates, and comprising subjecting these materials to mechanical milling.
Item 11. The method according to Item 10, wherein at least one member selected from the group consisting of crystalline niobium sulfide, amorphous (lithium) niobium sulfide, and amorphous (lithium) titanium niobium sulfide is used as a starting material or intermediate.
Item 12. The method according to Item 1, wherein sulfur is further used as a starting material.
Item 13. The method according to any one of Items 10 to 12, wherein at least one member selected from the group consisting of titanium-containing materials, lithium-containing materials, and carbonaceous materials is further used as a starting material.
Item 14. The method according to Item 13, wherein the titanium-containing material, is titanium sulfide, and the lithium-containing material is lithium sulfide.
Item 15. A charge-discharge product of the sulfide according to any one of Items 1 to 9, or of the sulfide produced by the method according to any one of Items 10 to 14.
Item 16. A cathode active material for lithium batteries comprising the sulfide according to any one of Items 1 to 9, or the sulfide produced by the method according to any one of Items 10 to 14.
Item 17. An electrode for lithium batteries comprising the cathode active material for lithium batteries according to Item 16.
Item 18. The electrode for lithium batteries according to Item 17, wherein the electrode is a cathode for lithium batteries.
Item 19. A lithium battery comprising the electrode for lithium batteries according to Item 17 or 18.
Item 20. The lithium battery according to Item 1.9, wherein the lithium battery is a non-aqueous electrolyte battery or an all-solid-state battery.

Advantageous Effects of Invention

The sulfide of the present invention is a sulfide having an element ratio of S to the sum of Ti and Nb of 2 or more, and is a polysulfide with a high sulfur ratio. Therefore, the sulfide of the present invention has high charge-discharge capacity. In particular, based on amorphization, the sulfide of the present invention has many sites into which lithium ions can be inserted and extracted, thus further increasing the charge-discharge capacity.

The sulfide of the present invention may further contain lithium. Even when the sulfide of the present invention contains lithium, the amorphous structure can be substantially maintained. Adjusting the composition of the sulfide of the present invention while incorporating lithium into the sulfide can further increase the average discharge potential and the electrical conductivity, while reducing capacity loss during charging and discharging.

Further, the sulfide of the present invention has excellent electrical conductivity and charge-discharge characteristics, even compared with titanium sulfide compounds. In particular, among the sulfides of the present invention, those containing a metal sulfide or a carbon material therein can further enhance the electrical conductivity.

Additionally, materials comprising an amorphous (lithium) niobium sulfide or an amorphous (lithium) titanium niobium sulfide as a matrix, and a metal sulfide or carbon that is present in the matrix, are such that microcrystals of carbon or metal sulfide having excellent electron conductivity and ion conductivity are contained in primary particles or secondary particles of the amorphous sulfide. Therefore, electrons and ions can be smoothly supplied to the inside of the sulfide particle, thus providing a further increased charge-discharge capacity.

When a material containing elemental sulfur, lithium sulfide, or the like is used as a cathode active material, a carbonate solvent cannot be used because the carbonate reacts with elemental sulfur. When an ether solvent is used, a large amount of a sulfur component is dissolved in an electrolyte, which causes performance deterioration. These are major challenges in using carbonate solvents or ether solvents. When the sulfide of the present invention is used as a cathode active material, these problems can be solved and any solvent is applicable, which improves the selectivity of the solvent for electrolytes.

Accordingly, the amorphous sulfide of the present invention is useful as a cathode active material for lithium batteries, such as lithium primary batteries, lithium secondary batteries, lithium ion second batteries, and can be effectively used as a cathode active material for lithium batteries, such as lithium primary batteries, lithium secondary batteries (including all-solid-state lithium secondary batteries comprising a solid electrolyte), and lithium ion secondary batteries.

BRIEF DESCRIPTION OF DRAWINGS

FIG. 1 is a graph showing X-ray diffraction patterns of niobium sulfide powders obtained in Examples 1 to 3. FIG. 1 also shows the peaks of $NbS_2$ powder and $S_8$ powder used as starting materials. The peaks of Kapton used for preventing air exposure are also detected.

FIG. 2 is a graph showing X-ray diffraction patterns of sulfide powders obtained in Examples 4 and 5. FIG. 2 also shows the peaks of $NbS_2$ powder and $S_8$ powder used as starting materials. The peaks of Kapton used for preventing air exposure are also detected.

FIG. 3 is a graph showing X-ray diffraction patterns of sulfide powders obtained in Examples 6 and 7. FIG. 3 also shows the peaks of $NbS_2$ powder, $TiS_2$ powder, and $S_8$ powder used as starting materials. The peaks of Kapton used for preventing air exposure are also detected.

FIG. 4 is a graph showing X-ray diffraction patterns of sulfide powders obtained in Comparative Examples 3 and 4. The peaks of Kapton used for preventing air exposure are also detected.

FIG. 5 is a graph showing X-ray diffraction patterns of sulfide powders obtained in Examples 10 to 11 and Comparative Examples 6 to 7. FIG. 5 also show the peaks of simulated $Li_3NbS_4$, and $Li_2S$ powder, $NbS_2$ powder, and $S_8$ a powder used as starting materials.

FIG. 6 is a graph showing X-ray diffraction patterns of sulfide powders obtained in Example 12 and Comparative Example 0.8 FIG. 6 also shows the peaks of $NbS_2$ powder and $S_8$ powder used as starting materials. The peaks of Kapton used for preventing air exposure are also detected.

FIG. 7 is a graph showing X-ray diffraction patterns of samples each prepared by mixing one of the samples of Examples 3 and 4 and Comparative Examples 1 and 5 with silicone. FIG. 7 also shows the peaks of silicon. The peaks of Kapton used for preventing air exposure are also detected.

FIG. 8 shows transmission electron microscope (TEM) images of the niobium sulfide powder obtained in Example 3. The images on the right show Fast Fourier Transform (FFT) patterns of the portions delineated by boxes in the TME images on the left. Both the upper and lower images depict the sulfide obtained in Example 3; however, these images show the measurement results of different particles.

FIG. 9 shows transmission electron microscope (TEM) images of the sulfide powder obtained in Example 5.

FIG. 10 is a graph showing the results of differential scan calorimetric analysis (DSC) of sulfides obtained in Examples 2, 3, 7, and 8. For comparison, FIG. 10 also shows a mixture of crystalline $NbS_2$ and $S_8$ (composition: $NbS_5$), a mixture of crystalline $TiS_2$, crystalline $NbS_2$; and $S_8$ (composition: $Ti_{0.5}Nb_{0.5}S_4$).

FIG. 11 is a graph showing the charge-discharge test results of the niobium sulfide powder obtained in Example 1.

FIG. 12 is a graph showing the charge-discharge test results of the niobium sulfide powder obtained in Example 2, FIG. 13 is a graph showing the charge-discharge test results of the niobium sulfide powder obtained in Example 3.

FIG. 14 is a graph showing the charge-discharge test results of the sulfide powder obtained in Example 5.

FIG. 15 is a graph showing the charge-discharge test results of the titanium niobium sulfide powder obtained in Example 7.

FIG. 16 is a graph showing the charge-discharge test results of the niobium sulfide powder obtained in Example 8.

FIG. 17 is a graph showing the charge-discharge test results of the titanium niobium sulfide powder obtained in Example 9.

FIG. 18 is a graph showing the charge-discharge test results of the lithium niobium sulfide powder obtained in Example 10.

FIG. 19 is a graph comparing the charge-discharge test results of the niobium sulfide powder obtained in Example 1 and the lithium niobium sulfide powder obtained in Example 10.

FIG. 20 is a graph showing the charge-discharge test results of the lithium niobium sulfide powder obtained in Example 11.

FIG. 21 is a graph showing the charge-discharge test results of the lithium niobium sulfide powder obtained in Comparative Example 1.

FIG. 22 is a graph showing the charge-discharge test results of the titanium sulfide powder obtained in Comparative Example 2.

FIG. 23 is a graph showing the charge-discharge test results of the lithium niobium sulfide powder obtained in Comparative Example 6.

FIG. 24 is a graph showing the charge-discharge test results of the lithium niobium sulfide powder obtained in Comparative Example 7.

FIG. 25 is a graph showing the charge-discharge test results (cycle characteristics) of the sulfides obtained in Example 1 and Comparative Example 3.

FIG. 26 is a graph showing the charge-discharge test results (cycle characteristics) of the sulfides obtained in Example 2 and Comparative Example 4.

FIG. 27 is a graph showing the charge-discharge test results (cycle characteristics) of the sulfides obtained in Example 2 and Comparative Example 3.

FIG. 28 is a graph showing X-ray diffraction patterns of the sulfide powders obtained in Comparative Examples 9 and 10. FIG. 28 also shows the peaks of $Li_2S$ powder, MnS powder, and $S_8$ powder used as starting materials.

FIG. 29 is a graph showing X-ray diffraction patterns of the sulfide powders obtained in Comparative Examples 11 and 12. FIG. 29 also shows the peaks of $FeS_2$ powder and $S_8$ powder used as starting materials.

FIG. 30 is a graph showing the charge-discharge test results of the iron sulfide powder obtained in Comparative Example 12.

DESCRIPTION OF EMBODIMENTS

In this specification, (lithium) niobium sulfide means niobium sulfide or lithium niobium sulfide. More specifically, (lithium) niobium sulfide includes sulfides containing niobium and sulfur, and sulfides containing lithium, niobium, and sulfur.

In this specification, (lithium) titanium niobium sulfide means titanium niobium sulfide or lithium titanium niobium sulfide. More specifically, (lithium) titanium niobium sulfide includes sulfides containing titanium, niobium, and sulfur, and sulfides containing lithium, titanium, niobium, and sulfur.

1. Sulfide

First Embodiment

The sulfide according to the first embodiment of the present invention is a sulfide comprising an amorphous (lithium) niobium sulfide having an average composition represented by formula (1):

$$Li_{k1}NbS_{n1}$$

(wherein $0 \leq k1 \leq 5$; $3 \leq n1 \leq 10$; and when $n1 \geq 3.5$, $k1 \leq 1.5$, or an amorphous (lithium) titanium niobium sulfide having an average composition represented by formula (2):

$$Li_{k2}Ti_{1-m2}Nb_{m2}S_{n2}$$

(wherein $0 \leq k2 \leq 5$; $0 < m2 < 1$; $2 \leq n2 \leq 10$; and when $n2 \geq 3.5$, $k2 \leq 1.5$).

The amorphous sulfide of the present invention is in an amorphous state in which diffraction peaks of the materials used as starting materials and the sulfide itself are hardly observed. Although the amorphous sulfide of the present invention has a high sulfur ratio in the average composition, little sulfur is present in the form of elemental sulfur; and sulfur is bound to niobium, titanium, and, optionally lithium or the like to form an amorphous sulfide. Thus, since the sulfide of the present invention is amorphous, the sulfide has many sites into which lithium can be inserted, and has gaps in the structure, which can three-dimensionally form a conductive pathway for lithium. Further, the amorphous sulfide of the present invention has many advantages, such as the ability to make three-dimensional volume changes during charging and discharging when used as an electrode for lithium batteries or lithium ion batteries. Therefore, the sulfide of the present invention can further increase the charge-discharge capacity.

Specifically, the X-ray diffraction diagram obtained using CuKα radiation shows that in the diffraction angle range of 2θ=10 to 80°, there are low diffraction peak intensities of the materials used as starting materials and the sulfide itself, with wide half-widths; or their diffraction peaks are hardly observed.

The "amorphousness," which is a characteristic of the sulfide of the present invention, is explained taking, as an example, the case of using niobium sulfide ($NbS_2$), titanium sulfide ($TiS_2$), lithium sulfide ($Li_2S$), sulfur ($S_8$), etc., as starting materials.

The highest intensity diffraction peak of a niobium sulfide having an R-3m structure ($NbS_2$; JCPDS 38-1367) as calculated from the crystal structure is present at 2θ=15.0±0.5°.

The sulfide of the present invention also has high diffraction peaks at 2θ=37.0±0.5° and 40.0°±0.5°. The half-width of the diffraction peak at 2θ=15.0±0.5° is about 0.15°. Accordingly, it is preferable that the diffraction peak of the amorphous sulfide of the present invention has a half-width of 0.3° or more at 2θ=15.0±0.5°, or that there is no diffraction peak at 2θ=15.0±0.5°. Satisfying this condition can more securely provide an amorphous sulfide of the present invention that is substantially free of crystalline niobium sulfide.

The strongest diffraction peak calculated from the crystal structure of titanium sulfide ($TiS_2$) is present at 2θ=15.5±0.5°. The half-width of the diffraction peak at 2θ=15.5±0.5° is about 0.2. Accordingly, it is preferable that the diffraction peak of the amorphous sulfide of the present invention at 2θ=15.0±0.5° has a half-width of 0.3° or more, or that there are no diffraction peaks at 2θ=15.0±0.5°. Satisfying this condition can more securely provide an amorphous sulfide of the present invention that is substantially free of crystalline titanium sulfide.

The strongest diffraction peak calculated from the crystal structure of lithium sulfide ($Li_2S$) is present at 2θ=27.0±0.5°. The half width of the diffraction peak at 2θ=27.0±0.5 is about 0.15°. Accordingly, it is preferable that the diffraction peak of the amorphous sulfide of the present invention preferably has a half width, of 0.5° or more at 2θ=27.0±0.5°, or that there is no diffraction peak at 2θ=27.0±0.5°. When a diffraction peak remains, the diffraction intensity at the diffraction angle (2θ) at which lithium sulfide used as a starting material exhibits the maximum intensity is preferably equal to or less than ⅕, more preferably equal to or less than 1/10 of the diffraction intensity of the lithium sulfide to be used as a starting material. As another rule of thumb for amorphization, the maximum diffraction peak intensity obtained by mixing 10 parts by mass of silicon per 100 parts by mass of the sulfide of the present invention is preferably not more than 10 times, more preferably not more than 5 times, and even more preferably not more than 1 time the maximum diffraction peak intensity of the silicon to be mixed. Satisfying this condition can more securely provide an amorphous sulfide of the present invention that is substantially free of crystalline lithium sulfide.

The strongest diffraction peak of sulfur ($S_8$) is present at 2θ=23.0±0.5°. Accordingly, it is preferable that the diffraction peak of the amorphous sulfide of the present invention has a half-width of 0.3° or more at 2θ=23.0±0.5°, or that there is no diffraction peak at 2θ=23.0±0.5°. When a diffraction peak remains, the diffraction intensity at the diffraction angle (2θ) at which sulfur used as a starting material exhibits the maximum intensity is preferably equal to or less than ⅕, more preferably equal to or less than 1/10, of the diffraction intensity of the sulfur to be used as a starting material. As another rule of thumb for amorphization, the maximum diffraction peak intensity obtained by mixing 10 parts by mass of silicon per 100 parts by mass of the sulfide of the present invention is preferably not more than 10 times, more preferably not more than 5 times, and even more preferably not more than 1 time the maximum diffraction peak intensity of the silicon to be mixed. Satisfying this condition can more securely provide an amorphous sulfide of the present invention that is substantially free of crystalline sulfur.

It is also preferable for the sulfide of the present invention to be such that the half-width of the diffraction peak of niobium sulfide at 2θ=37.0±0.5° and 40.0±0.5° is 0.3° or more (preferably 1.0° or more), or that there are no diffraction peaks at 2θ=37.0±0.5° and 40.0°±0.5°. The crystallite size can be sufficiently reduced by satisfying this level.

In the present invention, the half-width of the X diffraction peak can be obtained by a powder X-ray diffraction method. For example, the following measurement conditions can be used:

X-ray source: CuKα 5 kV-300 mA
Measurement conditions: 2θ=10 to 80°, 0.02° steps, scan speed: 10°/min.

The X-ray diffraction diagram obtained using CuKα radiation shows that as compared with usual crystalline niobium sulfide ($NbS_2$), titanium sulfide ($TiS_2$), lithium sulfide ($Li_2S$), and sulfur ($S_8$), sulfides satisfying the above conditions are such that diffraction peaks of niobium sulfide ($NbS_2$), titanium sulfide ($TiS_2$), lithium sulfide ($Li_2S$) and sulfur ($S_8$) have very wide half-widths, or there are no diffraction peaks of niobium sulfide ($NbS_2$), titanium sulfide ($TiS_2$), lithium sulfide ($Li_2S$), and sulfur ($S_8$). That is, the sulfide satisfying these conditions is a low crystalline sulfide comprising very finely divided niobium sulfide ($NbS_2$), titanium sulfide ($TiS_2$), lithium sulfide ($Li_2S$), and sulfur ($S_8$) used as starting materials, or forms an amorphous sulfide as a whole.

Accordingly, the sulfide of the present invention preferably has no crystallites, or has an average crystallite size of 5 nm or less (in particular, 0 to 2 nm, and more preferably 0 to 1.0 nm). The presence or absence of crystallites, and the crystallite size when crystallites are present are measured by electron microscope (TEM) observation.

Thus, the sulfide of the present invention is an amorphous sulfide in which fraction peaks of the materials used as starting materials and the sulfide itself are hardly observed. Specifically, for example, when using niobium sulfide ($NbS_2$), titanium sulfide ($TiS_2$), lithium sulfide ($Li_2S$), sulfur ($S_8$), etc., as starting materials, the sulfide of the present invention preferably has no diffraction peaks at diffraction angles 2θ=15.0±0 0.5°, 15.5±0.5°, 27.0±0.5°, and 23.0±0.5°; or has broad diffraction peaks.

The sulfide of the present invention having the above features has an average composition represented by formula (1):

$$Li_{k1}NbS_{n1}$$

(wherein 0≤k1≤5; 3≤n1≤10; and when n1≥3.5, k1≤1.5), or an average composition represented by formula (2):

$$Li_{k2}Ti_{1-m2}Nb_{m2}S_{n2}$$

(wherein 0≤k2≤5; 0<m2<1; 2≤n2≤10; and when n2≥3.5, k2≤1.5).

The (lithium) niobium sulfide represented by formula (1) may be niobium sulfide having an average composition represented by formula (1A):

$$NbS_{n1}$$

(wherein 3≤n1≤10)
or may be lithium niobium sulfide having an average composition represented by formula (1B):

$$Li_{k1}NbS_{n1}$$

(wherein 0<k1≤5; 3≤n1≤10; when n1≥3.5, k1≤1.5)

The (lithium) titanium niobium sulfide represented by formula (2) may be titanium niobium sulfide having an average composition represented by formula (2A):

$$Ti_{1-m2}Nb_{m2}S_{n2}$$

(wherein 0<m2<1; 2≤n2≤10),
or may be lithium titanium niobium sulfide having an average composition represented by formula (2B):

$$Li_{k2}Ti_{1-m2}Nb_{m2}S_{n2}$$

(wherein 0<k2≤5; 0<m2<1; 2≤n2≤10; when n2≥3.5, k2≤1.5).

In formulas (1) and (1B), k1, i.e., the molar ratio (Li/Nb) of lithium (Li) to niobium (Nb) is 0≤k1≤5, preferably 0≤k1≤4, more preferably 0≤k1≤3, even more preferably 0.5≤k1≤2. If k1 is too large, amorphous sulfide is not obtained, and the capacity loss during charging and discharging is great. On the other hand, in order to increase the average discharge potential while maintaining the charge-discharge capacity, k1 is preferably not too small.

In formulas (1), (1A), and (1B), n1, i.e., the molar ratio (S/Nb) of sulfur (S) to niobium (Nb) is 3≤n1≤10, preferably 3≤n1<8, more preferably 3.5≤n1≤6, and even more preferably 4≤n1≤5. If n1 is too small, charge and discharge derived from an oxidation-reduction reaction of sulfur are not performed, thus failing to obtain sufficient charge-discharge capacity. On the other hand; an excessively large n1 is also undesirable because it weakens the interaction between titanium or niobium and sulfur and incurs the presence of a large amount of free elemental sulfur, thus causing instability due to the insulative properties of and the solubility of the charge-discharge product.

In formulas (1) and (1B), when the sulfur content is high (specifically, when n1≥3.5, in particular, when 4≤n1≤10), a low lithium content (specifically, k1≤1.5, in particular, 0.5≤k1≤1.2) is preferable. When the sulfur content is high and the lithium content is higher than the sulfur content, amorphous sulfide is not obtained, and the capacity loss during charging and discharging is great.

In formulas (2) and (2B) k2, i.e. the molar ratio (Li/(Ti+Nb) of lithium (Li) to the sum of titanium (Ti) and niobium (Nb) is 0≤k2≤5, preferably 0≤k2≤4, more preferably 0≤k2≤3, and even more preferably 0.5≤k2≤2. When k2 is too large, the amorphous sulfide is not obtained, and capacity loss during charging and discharging is great. On the other hand, in order to increase the average discharge potential while maintaining the charge-discharge capacity, k2 is preferably not too small.

In formulas (2), (2A), and (2B), m2, i.e., the molar ratio (Nb/(Ti+Nb)) of niobium (Nb) to the sum of titanium (Ti) and niobium (Nb) can be freely determined in the range of 0<m2<1. Increasing the niobium (Nb) content can increase electrical conductivity as well as contribute to enhanced stability because free elemental sulfur is less likely to be formed even when sulfur content is increased in order to increase the charge-discharge capacity. Increasing the titanium (Ti) content can increase the charge-discharge capacity when the sulfur content is constant. Since a high niobium (Nb) content provides a high electrical conductivity, the amount of conductive metal sulfide or carbonaceous material as an additive can be reduced, m2 can be freely adjusted according to the cost of starting materials or desired performance, and is preferably 0.7≤m2≤1.

In formulas (2), (2A), and (2B), n2, i.e., the molar ratio (S/(Ti+Nb))) of sulfur (S) to the sum of titanium (Ti) and niobium (Nib) is 2≤n2≤10, preferably 2.5≤n≤8, more preferably 3≤n2≤6, and even more preferably 3≤n2≤5. When n2 is too small, a sufficient charge-discharge capacity cannot be obtained. On the other hand, an excessively large n2 is also undesirable because it weakens the interaction between titanium or niobium and sulfur, and incurs the presence of a large amount of free elemental sulfur, thus causing instability due to the insulative properties of and the solubility of the charge-discharge product.

In formulas (2) and (2B), when the sulfur content is high (specifically when n2≥3.5, in particular when 4≤n2≤10), a smaller lithium content (more specifically, k2≤1.5, in particular, 0.5≤k2≤1.2) is preferable. If the sulfur content is high and the lithium content is higher than the sulfur content, amorphous sulfide cannot be formed, and the capacity loss during charging and discharging is great.

In this specification, the average composition of the sulfide shows the element ratio of the elements constituting the entire sulfide.

As described above, although the sulfide of the present invention is a polysulfide having a high sulfur ratio in the average composition, little elemental sulfur is present as the sulfur source, and sulfur is bound to titanium, niobium, and, optionally lithium or the like to form an amorphous polysulfide. Similarly, little elemental lithium, little elemental titanium, and little elemental niobium are present as the lithium source, titanium source, and niobium source used as starting materials.

In the present invention, other impurities may be contained as long as they do not interfere with the desired performance of the sulfide. Examples of such impurities include metals that may be mixed into the starting materials, such as transition metals and main group metals; and oxygen or the like that may be mixed into starting materials or mixed during production. In particular, it is preferable to contain a small amount of a metal sulfide that may be mixed as a starting material (in particular, niobium sulfide, titanium sulfide, and, optionally lithium sulfide) because it allows microcrystals of the metal sulfide (in particular, niobium sulfide, titanium sulfide, and, optionally lithium sulfide) to be present as an amorphous sulfide matrix; this increases the electron conductivity, ion conductivity, etc., thus enhancing the electrical conductivity and charge-discharge capacity.

These impurities may be contained in any amount as long as they do not interfere with the performance of the sulfide described above. Generally, the amount of impurities is preferably not more than 2 wt. % (0 to 2 wt. %), and more preferably not more than 1.5 wt. % (0 to 1.5 wt %).

Among the impurities, the elemental, sulfur content is preferably as low as possible. From this viewpoint, endotherm at an onset temperature of around 100° C. in differential scanning calorimetric analysis (DSC) is preferably 2 J/g or less, more preferably 1 J/g or less, even more preferably 0.5 J/g or less, and particularly preferably 0.2 J/g or less. The lower limit is 0 J/g.

Second Embodiment

The sulfide according to the second embodiment of the present invention comprises an amorphous sulfide having an average composition represented by formula (3):

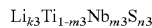

$Li_{k3}Ti_{1-m3}Nb_{m3}S_{n3}$ (wherein $0 \leq k3 \leq 5$; $0 < m3 \leq 1$; $2 \leq n3 \leq 10$; when $n3 \geq 3.5$, $k3 \leq 1.5$), and has an impurity concentration of not more than 2%.

The amorphous sulfide of the present invention is in an amorphous state in which diffraction peaks of the materials used as starting materials and the sulfide itself are hardly observed. Although the amorphous sulfide of the present invention has a high sulfur ratio in the average composition, little sulfur is present in the form of elemental sulfur, and sulfur is bound to niobium, titanium, and optionally lithium, or the like to form an amorphous sulfide. Thus, since the sulfide of the present invention is amorphous, the sulfide has many sites into which lithium can be inserted, and has gaps in the structure, which can three-dimensionally form a conductive pathway for lithium. Further, the amorphous sulfide of the present invention has many advantages, such as the ability to make three-dimensional volume changes during charging and discharging when used as an electrode for lithium batteries and lithium ion batteries. Therefore, the charge-discharge capacity can be further increased.

Specifically, the X-ray diffraction diagram obtained using CuKα radiation shows that in the diffraction angle range of 2θ=10 to 80°, there are low diffraction peak intensities of the materials used as starting materials and the sulfide itself, with wide half-widths, or their diffraction peaks are hardly observed.

The "amorphousness," which is a characteristic of the sulfide of the present invention is explained taking, as an example, the case of using niobium sulfide ($NbS_2$), titanium sulfide ($TiS_2$), lithium sulfide ($Li_2S$), sulfur ($S_8$), etc., as starting materials.

The highest intensity diffraction peak of a niobium sulfide having an R-3m structure ($NbS_2$; JCPDS 38-1367) as calculated from the crystal structure is present at 2θ=15.0±0.5°. The sulfide of the present invention also has high diffraction peaks at 2θ=37.0±0.5° and 40.0°±0.5°. The half-width of the diffraction peak at 2θ=15.0±0.5° is about 0.15°. Accordingly, it is preferable that the diffraction peak of the amorphous sulfide of the present invention has a half-width of 0.3° or more at 2θ=15.0±0.5°, or that there is no diffraction peak at 2θ=15.0±0.5°. Satisfying this condition can more securely provide an amorphous sulfide of the present invention that is substantially free of crystalline niobium sulfide.

The strongest diffraction peak calculated from the crystal structure of titanium sulfide ($TiS_2$) is present at 2θ=15.5±0.5°. The half-width of the diffraction peak at 2θ=15.5±0.5° is about 0.2°. Accordingly, it is preferable that the diffraction peak of the amorphous sulfide of the present invention has a half-width of 0.3° or more at 2θ=15.0±0.5°, or that there is no diffraction peak at 2θ=15.0±0.5°. Satisfying this condition can more securely provide an amorphous sulfide of the present invention that is substantially free of crystalline titanium sulfide.

The strongest diffraction peak calculated from the crystal structure of lithium sulfide ($Li_2S$) is present at 2θ=27.0±0.5°. The half width of the diffraction peak at 2θ=27.0±0.5° is about 0.15°. Accordingly, it is preferable that the diffraction peak of the amorphous sulfide of the present invention preferably has a half width of 0.5° or more at 2θ=27.0±0.5°, or that there is no diffraction peak at 2θ=27.0±0.5°. When a diffraction peak remains, the diffraction intensity at the diffraction angle (2θ) at which lithium sulfide used as a starting material, exhibits the maximum intensity is preferably equal to or less than ⅕, more preferably equal to or less than 1/10, of the diffraction intensity of the lithium sulfide to be used as a starting material. As another rule of thumb for amorphization, the maximum diffraction peak intensity obtained by mixing 10 parts by mass of silicon per 100 parts by mass of the sulfide of the present invention is preferably not more than 10 times, more preferably not more than 5 times, and even more preferably not more than 1 time the maximum diffraction peak intensity of the silicon to be mixed. Satisfying this condition can more securely provide an amorphous sulfide of the present invention that is substantially free of crystalline lithium sulfide.

The strongest diffraction peak of sulfur ($S_8$) is present at 2θ=23.0±0.5°. Accordingly, it is preferable that the diffraction peak of the amorphous sulfide of the present invention has a half-width of 0.3° or more at 2θ=23.0±0.5°, or that there is no diffraction peak at 2θ=23.0±0.5°. When a diffraction peak remains, the diffraction intensity at the diffraction angle (2θ) at which sulfur used as a starting material, exhibits the maximum intensity is preferably equal to or less than ⅕, more preferably equal to or less than 1/10, of the diffraction intensity of the sulfur to be used as a starting material. As another rule of thumb for amorphization, the maximum diffraction peak intensity obtained by mixing 10 parts by mass of silicon per 100 parts by mass of the sulfide of the present invention is preferably not more than 10 times, more preferably not more than 5 times, and even more preferably not more than 1 time the maximum diffraction peak intensity of the silicon mixed. Satisfying this condition can more securely provide an amorphous sulfide of the present invention that is substantially free of crystalline sulfur.

It is also preferable for the sulfide of the present invention to be such that the half-width of the diffraction peaks of niobium sulfide at 2θ=37.0±0.5° and 40.0°±0.5° is 0.3° or more (preferably 1.0° or more), or that there are no diffraction peaks at 2θ=37.0±0.5° and 40.0°±0.5°. Achieving this level can sufficiently reduce the crystallite size.

In the present invention, the half-width of the X diffraction peak can be obtained by a powder X-ray diffraction method. For example, the following measurement conditions can be used:
X-ray source: CuKα 5 kV-300 mA
Measurement conditions: 2θ=10 to 80°, 0.02° steps, scan speed: 10°/min.

The X-ray diffraction diagram obtained using CuKα radiation shows that as compared with usual crystalline niobium sulfide ($NbS_2$), titanium sulfide ($TiS_2$), lithium sulfide ($Li_2S$), and sulfur ($S_8$), sulfides satisfying the above conditions are such that diffraction peaks of niobium sulfide ($NbS_2$), titanium sulfide ($TiS_2$), lithium sulfide ($Li_2S$), and sulfur ($S_8$) have very wide half-widths, or there are no diffraction peaks of niobium sulfide ($NbS_2$), titanium sulfide ($TiS_2$), lithium sulfide ($Li_2S$), and sulfur ($S_8$). That is, the sulfide satisfying such conditions is a low crystalline sulfide containing very finely divided niobium sulfide ($NbS_2$), titanium sulfide ($TiS_2$), lithium sulfide ($Li_2S$) and sulfur ($S_8$) used as starting materials, or forms an amorphous sulfide as a whole.

Accordingly, the sulfide of the present invention preferably has no crystallites, or has an average crystallite size of 5 nm or less (in particular, 0 to 2 nm, more preferably 0 to 1.0 nm). The presence or absence of crystallites, and the crystallite size when crystallites are present, are measured by electron microscope (TEM) observation.

Thus, the amorphous sulfide of the present invention is in an amorphous state in which diffraction peaks of the materials used as starting materials and the sulfide itself are hardly observed. More specifically, for example, when niobium sulfide ($NbS_2$), titanium sulfide ($TiS_2$), lithium sulfide ($Li_2S$), sulfur ($S_8$), and the like are used as starting materials, the sulfide of the present invention preferably has no diffraction peaks at diffraction angles 2θ=15.0±0.5°, 15.5±0.5°, 27.0±0.5°, and 23.0±0.5°, or has broad diffraction peaks.

The sulfide of the present invention having the above features has an average composition represented by formula (3):

$$Li_{k3}Ti_{1-m3}Nb_{m3}S_{n3}$$

(wherein 0≤k3≤5; 0<m3≤1; 2≤n3≤10; when n3≥3.5, k3≤1.5)

The (lithium) titanium niobium sulfide represented by formula (3) may be titanium niobium sulfide having an average composition represented by formula (3A):

$$Ti_{1-m3}Nb_{m3}S_{n3}$$

(wherein 0<m3≤1; 2≤n3≤10), or
may be lithium titanium niobium sulfide having an average composition represented by formula (3B)

$$Li_{k3}Ti_{1-m3}Nb_{n3}S_{n3}$$

(wherein 0≤k3≤5; 0<m3≤1; 2≤n3≤10; when n3≥3.5, k3≤1.5).

In formulas (3) and (3B), k3, i.e., the molar ratio (Li/(Ti+Nb)) of lithium (Li) to the sum of titanium (Ti) and niobium (Nb) is 0≤k3≤5, preferably 0≤k3≤4, more preferably 0≤k3≤3, and even more preferably 0.5≤k3≤2. When k3 is too large, the amorphous sulfide is not obtained, and the capacity loss during charging and discharging is great. On the other hand, in order to increase the average discharge potential while maintaining the charge-discharge capacity, k3 is preferably not too small.

In formulas (3), (3A), and (3B), m3, i.e., the molar ratio (Nb/(Ti+Nb)) of niobium (b) to the sum of titanium (Ti) and niobium (Nb), can be freely determined in the range of 0<m3≤1. Increasing the niobium (Nb) content can enhance the electrical conductivity. Increasing the titanium (Ti) content can increase the charge-discharge capacity as well as contribute to enhance the conductivity and stability because free elemental sulfur is less likely to be formed, even when sulfur content is increased in order to further increase the charge-discharge capacity. Since a high niobium (Nb) content provides high electrical conductivity, the amount of conductive metal sulfide and carbonaceous material as impurities can be reduced. m3 can be freely adjusted according to the cost of starting materials or desired performance, and is preferably 0.7≤m3≤1.

In formulas (3), (3A), and (3B), n3, i.e., the molar ratio (Nb/(Ti+Nb) of sulfur (S) to the sum of titanium (Ti) and niobium (Nb) may be 2≤n3≤10, preferably 2.5≤n3≤8, more preferably 3≤n3≤6, and even more preferably 3≤n3≤5. When n4 is too small, a sufficient charge-discharge capacity cannot be obtained. On the other hand, an excessively large n3 is also undesirable because it weakens the interaction between titanium or niobium and sulfur and incurs the presence of a large amount of free elemental sulfur, thus causing instability because of the insulative properties of elemental sulfur and the solubility of the charge-discharge product.

In formulas (3) and (3B), when the sulfur content is sign (specifically when n3≥3.5, in particular 4≤n3≤10), a smaller lithium content (more specifically, k3≤1.5, in particular, 0.5≤k3≤1.2) is preferable. If the sulfur content is high and the lithium content is higher than the sulfur content, no amorphous sulfide can be formed, and the capacity loss during charging and discharging is great.

In the present specification, the average composition of sulfide shows the element ratio of the elements constituting the entire sulfide.

As described above, the sulfide of the present invention is a polysulfide having a high sulfur ratio in the average composition. However, little elemental sulfur is present as the sulfur source, and sulfur is bound to titanium, niobium, and optionally lithium or the like to form an amorphous polysulfide. Similarly, little elemental lithium, little elemental titanium, and little elemental niobium are present as the lithium source, titanium source, and niobium source used as starting materials.

In the present invention, other impurities may be contained as long as they do not interfere with the desired performance of the sulfide. Examples of such impurities include metals that may be mixed into starting materials, such as transition metals and main group metals; and oxygen and the like that may be mixed into starting materials or mixed during production. In particular, it is preferable to contain a small amount of a metal sulfide that may be mixed as a starting material (in particular, niobium sulfide, titanium sulfide, and, optionally lithium sulfide), because it causes microcrystals of the metal sulfide (in particular, niobium sulfide, titanium sulfide, and, optionally lithium sulfide) to be present as an amorphous sulfide matrix. This increases the electron conductivity, ion conductivity, etc., thus enhancing the electrical conductivity and charge-discharge capacity.

The amount of these impurities is preferably within the range such that the impurities do not interfere with the above-mentioned performance of the sulfide, more preferably 2 wt. % or less (0 to 2 wt. %), and even more preferably 1.5 wt. % or less (0 to 1.5 wt. %).

Among the impurities, the elemental sulfur content is preferably as low as possible. From this viewpoint, endotherm at an onset temperature of around 100° C. in differential scanning calorimetric analysis (DSC) is preferably 2 J/g or less, more preferably 1 J/g or less, even more preferably 0.5 J/g or less, and particularly preferably 0.2 J/g or less. The lower limit is 0 J/g.

Third Embodiment

The sulfide according to the third embodiment of the present invention has an average composition represented by formula (4):

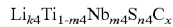

$Li_{k4}Ti_{1-m4}Nb_{m4}S_{n4}C_x$ (wherein 0≤k4≤5; 0<m4≤5; 0<m4≤1; 2≤n4≤10; 0≤x≤10; when n4≥3.5, k4≤1.5), and comprises crystalline amorphous (lithium) niobium sulfide or (lithium) titanium niobium sulfide as a matrix, and crystalline metal sulfide or carbon that is present in the matrix.

The amorphous (lithium) niobium sulfide or (lithium) titanium niobium sulfide that forms a matrix in the sulfide of the present invention is in an amorphous state in which diffraction peaks of the materials used as starting materials and the sulfide itself are hardly observed. The average composition of the amorphous (lithium) niobium sulfide or (lithium) titanium niobium sulfide, which is a matrix in the sulfide of the present invention, and metal sulfide or carbon, which is contained in the matrix, has a high sulfur ratio (the matrix itself also has a high sulfur ratio). However, little sulfur is present in the form of elemental sulfur, and sulfur is bound to niobium, titanium, and, optionally lithium or the like, to form an amorphous sulfide, and is present as a matrix. Thus, since the matrix is amorphous, the sulfide of the present invention has many sites into which lithium can be inserted, and has gaps in the structure, which can three-dimensionally form a conductive pathway for lithium. Further, the amorphous sulfide of the present invention has many advantages, such as the ability to make three-dimensional volume changes during charging and discharging when used as an electrode for lithium batteries and lithium ion batteries. Therefore, charge-discharge capacity can be further increased.

Specifically, the (lithium) niobium sulfide or (lithium) titanium niobium sulfide that is used as a matrix is such that in the X-ray diffraction diagram obtained using CuKα radiation, low diffraction peak intensities of the materials used as starting materials and the sulfide itself in the diffraction angle range of 2θ=10 to 80° are observed with wide half-widths, or their diffraction peaks are hardly observed in the diffraction angle range of 2θ=10 to 80°.

The "amorphousness," which is a characteristic of (lithium) niobium sulfide or (lithium) titanium niobium sulfide of the present invention, is explained below, taking as an example the case of using niobium sulfide ($NbS_2$), titanium sulfide ($TiS_2$), lithium sulfide ($Li_2S$), sulfur ($S_8$), a carbonaceous material, and the like as starting materials.

The highest intensity diffraction peak of a niobium sulfide having an R-3m structure ($NbS_2$; JCPDS 38-1367) as calculated from the crystal structure is present at 2θ=15.0±0.5°. There are also high diffraction peaks at 2θ=37.0±0.5° and 40.0°±0.5°. The half-width of the diffraction peak at 2θ=15.0±0.5° is about 0.15°. Accordingly, it is preferable that the diffraction peak of the amorphous sulfide of the present invention has a half-width of 0.3° or more at 2θ=15.0±0.5°, or that there is no diffraction peak at 2θ=15.0±0.5°. Satisfying this condition can more securely provide an amorphous sulfide of the present invention that is substantially free of crystalline niobium sulfide.

The strongest diffraction peak calculated from the crystal structure of titanium sulfide ($TiS_2$) is present at 2θ=15.5±0.5°. The half-width of the diffraction peak at 2θ=15.5±0.5° is about 0.2°. Accordingly, it is preferable that the diffraction peak of the amorphous niobium sulfide or titanium niobium sulfide as a matrix has a half-width of 0.3° or more at 2θ=15.0±0.5°, or that there is no diffraction peak at 2θ=15.0±0.5°. Satisfying this condition can more securely provide an amorphous niobium sulfide or titanium niobium sulfide as a matrix, which is substantially free of crystalline titanium sulfide.

The strongest diffraction peak calculated from the crystal structure of lithium sulfide ($Li_2S$) is present at 2θ=27.0±0.5°. The half-width of 2θ=27.0±0.5 is about 0.15°. Accordingly, it is preferable that the diffraction peak of the amorphous sulfide of the present invention preferably has a half width of 0.5° or more at 2θ=27.0±0.5° or that there is no diffraction peak at 2θ=27.0±0.5°. When a diffraction peak remains, the diffraction intensity at the diffraction angle (2θ) at which lithium sulfide used as a starting material exhibits the maximum intensity is preferably equal to or less than ⅕, more preferably equal to or less than 1/10, of the diffraction intensity of the lithium sulfide to be used as a starting material. As another rule of thumb for amorphization, the maximum diffraction peak intensity obtained by mixing 10 parts by mass of silicon per 100 parts by mass of the sulfide of the present invention is preferably not more than 10 times, more preferably not more than 5 times, and even more preferably not more than 1 time the maximum diffraction peak intensity of the silicon mixed. Satisfying this condition can more securely provide an amorphous sulfide of the present invention that is substantially free of crystalline lithium sulfide.

The strongest diffraction peak of sulfur ($S_8$) is present at 2θ=23.0±0.5°. Accordingly, it is preferable that the diffraction peak of the amorphous niobium sulfide or titanium niobium sulfide used as a matrix has a half-width of 0.3° or more at 2θ=23.0±0.5°, or that there is no diffraction peak at 2θ=23.0±0.5°. When a diffraction peak remains, the diffraction intensity at the diffraction angle (2θ) at which sulfur used as a starting material exhibits the maximum intensity is preferably equal to or less than ⅕, more preferably equal to or less than 1/10, of the diffraction intensity of the sulfur to be used as a starting material. As another rule of thumb for amorphization, the maximum diffraction peak intensity obtained by mixing 10 parts by mass of silicon per 100 parts by mass of the sulfide of the present invention is preferably not more than 10 times, more preferably not more than 5 times, and even more preferably not more than 1 time the maximum diffraction peak intensity of the silicon to be mixed. Satisfying this condition can more securely provide an amorphous niobium sulfide or titanium niobium sulfide used as a matrix, which is substantially free of crystalline sulfur.

It is also preferable for the (lithium) niobium sulfide or (lithium) titanium niobium sulfide used as a matrix to be such that the half-width of the diffraction peak of niobium sulfide at 2θ=37.0±0.50° and 40.0°±0.5° is 0.3° or more (preferably 1.0° or more), or that there are no diffraction peaks at 2θ=37.0±0.5° and 40.0°±0.5°. Achieving this level can sufficiently reduce the crystallite size.

In the present invention, the half-width of the X diffraction peak can be obtained by a powder X-ray diffraction method. For example, the following measurement conditions can be used:
X-ray source: CuKα 5 kV-300 mA
Measurement conditions: 2θ=10 to 80°, 0.02° steps, scan speed: 10°/min.

In the X-ray diffraction diagram obtained using CuKα radiation, as compared with usual crystalline niobium sulfide ($NbS_2$), titanium sulfide ($TiS_2$), lithium sulfide ($Li_2S$), and sulfur ($S_8$), (lithium) niobium sulfide or (lithium) titanium niobium sulfide that is a matrix satisfying the above conditions are such that diffraction peaks of niobium sulfide ($NbS_2$), titanium sulfide ($TiS_2$), lithium sulfide ($Li_2S$), and sulfur ($S_8$) have very wide half-widths, or there are no diffraction peaks of niobium sulfide ($NbS_2$), titanium sulfide ($TiS_2$), lithium sulfide ($Li_2S$), and sulfur ($S_8$). That is, niobium sulfide or titanium niobium sulfide satisfying such conditions is a low crystalline sulfide containing very finely divided niobium sulfide ($NbS_2$), titanium sulfide ($TiS_2$), lithium sulfide ($Li_2S$), and sulfur ($S_8$) as starting materials, or forms an amorphous sulfide as a whole.

Accordingly, the (lithium) niobium sulfide or (lithium) titanium niobium sulfide as a matrix preferably has no crystallites, or has an average crystallite size of 5 nm or less (particularly 0 to 2 nm, and more preferably 0 to 1.0 nm). The presence or absence of crystallites, and the crystallite size when crystallites are present are measured by electron microscope (TEM) observation.

Thus, the (lithium) niobium sulfide or (lithium) titanium niobium sulfide as a matrix is in an amorphous state in which diffraction peaks of the materials used as starting materials and the sulfide itself are hardly observed. More specifically, when using, for example, niobium sulfide ($NbS_2$) titanium sulfide ($TiS_2$), lithium sulfide ($Li_2S$), sulfur ($S_8$), and the like as starting materials, the sulfide of the present invention preferably has no diffraction peaks at diffraction angles 2θ=15.0±0.5°, 15.5±0.5°, 27.0±0.5°, and 23.0±0.5°; or has broad diffraction peaks.

As described above, although the (lithium) niobium sulfide or (lithium) titanium niobium sulfide as a matrix is a polysulfide having a high sulfur ratio in the average composition, little elemental sulfur is present as the sulfur source, and sulfur is bound to titanium, niobium, and, optionally lithium or the like, to form an amorphous polysulfide. Similarly, little elemental lithium, little elemental titanium, and little elemental niobium are present as the lithium source, titanium source, and niobium source used as starting materials. This also applies to the sulfide of the present invention.

Thus, in the present invention, a metal sulfide (in particular, niobium sulfide, titanium sulfide, and, optionally lithium sulfide) or carbon (in particular, carbon blacks, such as acetylene black and Ketjenblack, carbon nanotubes, carbon fibers, graphite, graphene, etc.) is present in a pure amorphous (lithium) niobium sulfide or (lithium) titanium niobium sulfide (matrix). Accordingly, microcrystals of a metal sulfide or carbon are present in an amorphous sulfide as a matrix. This increases the electron conductivity, ion conductivity, etc., thus enhancing the electrical conductivity and charge-discharge capacity.

The amount of these impurities (metal sulfide or carbon) is preferably within the range such that the impurities do not interfere with the performance of (lithium) niobium sulfide or (lithium) titanium niobium sulfide (matrix) described above. Specifically, the amount is 20 wt. % or less (0 to 20 wt. %) and more preferably 10 wt. % or less (0 to 10 wt. %).

Among the impurities, the elemental sulfur content is preferably as low as possible. From this viewpoint, endotherm at an onset temperature of around 100° C. in differential scanning calorimetric analysis (DSC) is preferably 2 J/g or less, more preferably 1 J/g or less, further preferably 0.5 J/g or less, and particularly preferably 0.2 J/g or less. The lower limit is 0 J/g.

When metal sulfide, carbon, etc., exist as impurities, diffraction peaks of lithium source, niobium source, titanium source, carbon, etc. are confirmed from an X-ray diffraction diagram. However, diffraction peaks of elemental sulfur are hardly confirmed. Thus, the sulfide of the present invention is a complex of amorphous (lithium) niobium sulfide or (lithium) titanium niobium sulfide with crystalline metal sulfide, carbon, etc.

Specifically, the sulfide of the present invention is such that in the X-ray diffraction diagram obtained using CuKα radiation, there are low diffraction peak intensities of metal sulfide, carbon, etc., with wide half-widths, in the diffraction angle range of 2θ=10 to 80°.

In the sulfide of the present invention having the above features, the amorphous (lithium) niobium sulfide or (lithium) titanium niobium sulfide as a matrix and metal sulfide(s) or carbon(s) as impurities have an average composition represented by formula (4):

$$Li_{k4}Ti_{1-m4}Nb_{m4}S_{n4}C_x$$

(wherein 0≤k4≤5; 0<m4≤1; 2≤n4≤10; 0≤x≤10; when n4≥3.5, k4≤1.5).

The (lithium) titanium niobium sulfide represented by formula (4) may be titanium niobium sulfide having an average composition represented by formula (4A):

$$Ti_{1-m4}Nb_{m4}S_{n4}C_x$$

(wherein 0<m4≤1; 2≤n4≤10; 0≤x≤10), or lithium titanium niobium sulfide having an average composition represented by formula (4B):

$$Li_{k4}Ti_{1-m4}Nb_{m4}S_{n4}C_x$$

(wherein 0≤k4≤5; 0<m4≤1; 2≤n4≤10; 0≤x≤10; when n4≤3.5, k4≤1.5).

In formulas (4) and (4B), k4, i.e., the molar ratio (Li/(Ti+Nb)) of lithium (Li) to the sum of titanium (Ti) and niobium (Nb) is 0≤k4≤5, preferably 0≤k4≤4, more preferably 0≤k4≤3, and even more preferably 0.5≤k4≤2. When k4 is too large, amorphous sulfide is not obtained, and the capacity loss during charging and discharging is great. On the other hand, in order to increase the average discharge potential while maintaining charge-discharge capacity, k4 is preferably not too small.

In formulas (4), (4A), and (4B), m4, i.e., the molar ratio (Nb/(Ti+Nb)) of niobium (Nb) to the sum of titanium (Ti) and niobium (Nb) can be freely set within 0<m4≤1. Increasing the niobium (Nb) content can enhance electrical conductivity. Increasing the titanium (Ti) content can increase the charge-discharge capacity as well as contribute to further enhance the charge-discharge capacity and stability because free elemental sulfur is less likely to be formed even when sulfur content is increased in order to further increase the charge-discharge capacity. Because a high niobium (Nb) content provides a high electrical conductivity, the amount of conductive metal sulfide and carbonaceous material as impurities can be reduced. m4 can be freely adjusted according to the cost of starting materials or desired performance, and is preferably $0.7 \leq m4 \leq 1$.

In formulas (4), (4A), and (4B), n4, i.e., the molar ratio (S/(Ti+Nb)) of sulfur (S) to the sum of titanium (Ti) and niobium (Nb), is $2 \leq n4 \leq 10$, preferably $2.5 \leq n4 \leq 8$, more preferably $3 \leq n4 \leq 6$, and even more preferably $3 \leq n4 \leq 5$. When n4 is too small, a sufficient charge-discharge capacity cannot be obtained. On the other hand, an excessively large n4 is also not preferable because it weakens the interaction between titanium or niobium and sulfur, and incurs the presence of a large amount of free elemental sulfur.

In formulas (4) and (4B), when the sulfur content is high (specifically, when $n4 \geq 3.5$, in particular, when $4 \leq n4 \leq 10$), a low lithium content (specifically, $k4 \leq 1.5$, in particular, $0.5 \leq k1 \leq 1.2$) is preferable. When the sulfur content is high and the lithium content is greater than the sulfur content, no amorphous sulfide can be formed, and the capacity loss during charging and discharging is great.

In formula (4), x, i.e., the molar ratio (C/(Ti+Nb)) of carbon (C) to the sum of titanium (Ti) and niobium (Nb), is $0 \leq x \leq 10$, preferably $0 \leq x \leq 5$, more preferably $0.5 \leq x \leq 4$, and even more preferably $0.7 \leq x \leq 3$. This is because a high molar ratio can enhance electrical conductivity, whereas an excessively high molar ratio leads to reduction of charge-discharge capacity.

In the present specification, the average composition of sulfide shows the element ratio of the elements constituting the entire sulfide.

2. Method for Producing the Sulfide

The sulfide of the present invention can be obtained by a production method using a niobium-containing material and a sulfur-containing material as starting materials or intermediates, and comprising subjecting these materials to mechanical milling.

When the sulfide of the present invention is to contain titanium, a titanium-containing material may be further used as a starting material or an intermediate. When the sulfide of the present invention is to contain lithium, a lithium-containing material may be further used as a starting material or an intermediate. When the sulfide of the present invention is to contain carbon, a carbonaceous material may be further used as a starting material or an intermediate.

These starting materials or intermediates may all be mixed together simultaneously and subjected to mechanical milling. Alternatively, after a portion of the starting materials or intermediates are first subjected to mechanical milling, the remaining materials may be added and subjected to mechanical milling. Specifically, when a niobium-containing material, a titanium-containing material, a lithium-containing material, a sulfur-containing material, and a carbonaceous material are used as starting materials or intermediates, the niobium-containing material, titanium-containing material, lithium-containing material, and sulfur-containing material, and carbonaceous material may be simultaneously subjected to mechanical milling. Alternatively, after a niobium-containing material, a lithium-containing material, a titanium-containing material, and a sulfur-containing material are subjected to mechanical milling, a carbonaceous material may be added and subjected to mechanical milling.

In particular, when sulfides (of formulas (1) to (4) wherein n1 to $n4 \geq 3.5$) with a high sulfur content are to be produced, crystalline sulfides may be obtained depending on the amount of starting materials fed. Therefore, the sulfide of the present invention is preferably produced in the following manner. After a niobium-containing material and a portion of a sulfur-containing material, optionally with a titanium-containing material, a lithium-containing material, and a carbonaceous material, are subjected to mechanical milling to obtain a desired amorphous sulfide (amorphous (lithium) niobium sulfide or amorphous (lithium) titanium niobium sulfide) as an intermediate, the intermediate and the remaining sulfur-containing material are subjected to mechanical milling. This can more securely render the sulfide of the present invention amorphous, and reduce capacity loss during charging and discharging.

Specific examples of starting materials are as follows. As a niobium-containing and sulfur-containing material, crystalline niobium sulfide ($NbS_2$) is preferably used. The $NbS_2$ to be used is not particularly limited, and any commercially available $NbS_2$ can be used. In particular, using a high-purity $NbS_2$ is preferable. Because $NbS_2$ is mixed and pulverized by mechanical milling, the particle size of the $NbS_2$ to be used is not particularly limited. A commercially available $NbS_2$ powder can typically be used. As a niobium-containing and sulfur-containing material, not only $NbS_2$ but also any commercially available $Nb_3S_4$, $NbS_3$, etc., can also be used.

As a titanium-containing and sulfur-containing material, crystalline titanium sulfide ($TiS_2$) is preferably used. The $TiS_2$ is not particularly limited, and any commercially available $TiS_2$ can be used. In particular, using a high-purity $TiS_2$ is preferable. Because $TiS_2$ is mixed and pulverized by mechanical milling, the particle size of the $TiS_2$ to be used is not particularly limited. A commercially available $TiS_2$ powder can typically be used. As a titanium-containing and sulfur-containing material, other materials such as any commercially available TiS, $TiS_3$, and amorphous titanium sulfide can also be used.

Further, as a lithium-containing and sulfur-containing material, crystalline lithium sulfide ($LiS_2$) is preferably used. The $LiS_2$ is not particularly limited, and any commercially available $LiS_2$ can be used. In particular, using a high-purity $LiS_2$ is preferable. Because $LiS_2$ is mixed and pulverized by mechanical milling, the particle size of the $LiS_2$ to be used is not particularly limited. A commercially available $LiS_2$ powder can typically be used. As a lithium-containing and sulfur-containing material, other materials, such as any commercially available lithium polysulfide ($LiS_x$: $2 \leq x \leq 8$) or the like, can also be used.

Materials other than the starting materials mentioned above are also usable. For example, Nb can be used as a niobium-containing material; Ti can be used as a titanium-containing material; and Li can be used as a lithium-containing material. Crystalline $Ti_{0.5}Nb_{0.5}S_2$ can be used as a niobium-containing, titanium-containing, and sulfur-containing material, $Li_2TiS_3$ can be used as a lithium-containing, titanium-containing, and sulfur-containing material. $Li_3NbS_4$ etc. can be used as a lithium-containing, niobium-containing, and sulfur-containing material.

If necessary, elemental sulfur ($S_8$) may be used as a sulfur-containing material in an amount required to form a sulfide having a desired composition. For example, when crystalline $NbS_2$ is used as a niobium-containing material, crystalline $TiS_2$ is used as a titanium-containing material, and crystalline $Li_2S$ is used as a lithium-containing material, elemental sulfur ($S_8$) may be further added to form a sulfide having the desired composition.

The sulfur to be used as a starting material is also not particularly limited, and any sulfur can be used. In particular, using a high-purity sulfur is preferable. Because sulfur is mixed and pulverized by mechanical milling, the particle size of the sulfur to be used is not particularly limited. A commercially available sulfur powder can typically be used.

Further, as a carbon material, a carbonaceous material can be used in an amount required to form a sulfide having the desired composition. For example, when crystalline $NbS_2$, crystalline $TiS_2$, $Li2_S$, and elemental sulfur ($S_8$) are used as a niobium-containing material, a titanium-containing material, a lithium-containing material, and a sulfur-containing material, respectively, a carbonaceous material may be further added to form a sulfide having the desired composition.

Although the carbonaceous material is not particularly limited, a conductive carbon material is preferable from the viewpoint of enhancing electrical conductivity. Specific examples of such carbonaceous materials include various carbon materials commonly used as conducting agents, such as commercially available acetylene black, Ketjenblack, and carbon blacks, carbon nanotubes, carbon fibers, graphite, and graphene. In particular, carbon black having a primary particle diameter of 50 nm or less and needle-like carbon having a diameter of 50 nm or less are preferable.

Furthermore, when using two-step mechanical milling as described above, the intermediate may be, for example, amorphous niobium sulfide (e.g., a-$NbS_3$), amorphous titanium sulfide (e.g., a-$TiS_3$), amorphous titanium niobium sulfide (e.g., a-$Ti_{0.5}Nb_{0.5}S_3$), or the like as a niobium-containing and sulfur-containing material.

The mixing ratio of these starting materials may be adjusted to the same ratio as the element ratio of niobium, titanium, lithium, sulfur, and carbon in the desired sulfide.

Mechanical milling is a method of milling and mixing starting materials while imparting mechanical energy. This method gives a mechanical impact and friction to starting materials to mill and mix the materials, whereby a niobium-containing material and a sulfur-containing material, optionally with a titanium-containing material, a lithium-containing material, and a carbonaceous material, are vigorously contacted with each other and divided into fine particles to allow the reaction of the starting materials to proceed. That is, in this case, mixing, pulverization, and reaction occur simultaneously. Therefore, without heating the starting materials at high temperature, the reaction of the starting materials can securely proceed. Mechanical milling may provide a thermodynamic non-equilibrium phase that cannot be obtained by ordinary heat treatment.

Specific examples of mechanical milling include mixing and pulverization using a mechanical pulverizer, such as ball mills, rod mills, vibration mills, disc mills, hammer mills, jet mills, and VSI mills.

Sulfur is prone to evaporate at overly high temperatures. Therefore, when sulfur is used as a starting material, mechanical milling is preferably performed at a temperature of not more than 200° C., and more preferably about −10 to 170° C., so as to facilitate the formation of a desired polysulfide with a high sulfur content in order to obtain a high-capacity electrode material.

The mechanical milling time is not particularly limited. The mechanical milling can be performed for any length of time until the desired sulfide is precipitated.

For example, the mechanical milling can be performed for about 0.1 to 100 hours while applying energy in an amount of 0.1 to 100 kWh/kg of the starting mixture.

The amount of the starting materials and intermediates to be fed in this mechanical milling is preferably 0.01 to 0.1 q; and more preferably 0.015 to 0.05 g, per mL of the internal volume of the reaction vessel in view of more securely forming an amorphous sulfide to increase the charge-discharge capacity and enhance the cycle characteristics, as well as to reduce the capacity loss during charging and discharging.

When the mechanical milling is repeated multiple times, each step of the mechanical milling may be performed under the above-mentioned conditions.

The mechanical milling can produce the desired sulfide in the form of a fine powder. As a result, a fine powder sulfide with a mean particle size of about 1 to 20 μm, and more preferably about 2 to 10 μm, can be obtained. The mean particle size of the sulfide refers to a median diameter ($d_{50}$) obtained by the dry laser diffraction scattering method.

3. Use of Sulfide

The above sulfide is a polysulfide in an amorphous state that has a high element ratio of sulfur (S) to the sum of niobium (Nb) and titanium (Ti), and therefore has a high charge-discharge capacity. This sulfide also has a high electrical conductivity. This tendency of increased electrical conductivity is particularly remarkable when metal sulfide and/or carbon are present in an amorphous sulfide matrix. Further, when the sulfide of the present invention contains lithium (Li), capacity loss during charging and discharging can be reduced while increasing the average discharge potential.

The sulfide of the present invention having such characteristics is particularly useful as a cathode active material for lithium batteries such as lithium primary batteries, metal lithium secondary batteries, and lithium-ion secondary batteries. The lithium batteries in which the sulfide of the present invention can be effectively used as an electrode active material (in particular, a cathode active material) may be non-aqueous electrolyte lithium secondary batteries (in particular, non-aqueous lithium secondary batteries) comprising a non-aqueous solvent electrolyte as an electrolyte, or all-solid-state lithium secondary batteries (in particular all-solid-state lithium secondary batteries) comprising a lithium-ion-conductive solid electrolyte.

The non-aqueous electrolyte lithium batteries (in particular, non-aqueous electrolyte lithium secondary batteries) and all-solid-state lithium batteries (in particular, all-solid-state lithium secondary batteries) may have the same structures as known lithium batteries except that the sulfide of the present invention is used as an electrode active material (in particular, a cathode active material).

For example, the non-aqueous electrolyte lithium batteries (in particular, non-aqueous electrolyte lithium secondary batteries) may have the same basic structures as known non-aqueous electrolyte lithium batteries (in particular, non-aqueous electrolyte lithium secondary batteries) except that the sulfide described above is used as an electrode active material (in particular, a cathode active material).

The cathode may have the same structure as a known cathode, except that the sulfide described above is used as a cathode active material. For example, when a conducting agent is added to the sulfide of the present invention, high electron conductivity and ion conductivity can be imparted by the presence of the conducting agent added. The cathode mixture prepared by mixing the binder of these materials may be supported on a cathode current collector, such as aluminum, nickel, or stainless steel to form a cathode. Examples of conductive agents include carbon materials such as graphite, cork, carbon black, and acicular carbon.

As the negative electrode for metal lithium primary batteries and metal lithium secondary batteries, for example, lithium metal, lithium alloy, and the like can be used. For lithium ion secondary batteries, for example, materials capable of doping and dedoping lithium ions and already containing lithium ions can be used as active materials. These negative electrode active materials may also be supported on a negative electrode current collector comprising aluminum, nickel, or stainless steel using a conducting agent, a binder, etc., if necessary.

As a separator, for example, a material that is made of a polyolefin resin, such as polyethylene or polypropylene, fluororesin, nylon, aromatic aramid, inorganic glass, or like materials and that is in the form of a porous membrane, a nonwoven fabric, a woven fabric, or the like can be used.

Examples of the solvent for non-aqueous electrolytes include solvents known as solvents for non-aqueous secondary batteries, such as carbonates, ethers, nitriles, sulfur-containing compounds. In particular, according to conventional methods, when elemental sulfur is used as a cathode active material, neither carbonates nor ethers can be used as a solvent in a conventional manner. This is because a carbonate, if used as a solvent, reacts with elemental sulfur; whereas an ether, if used as a solvent, causes dissolution of a large amount of a sulfur component in an electrolyte solution, thus incurring performance degradation. In contrast, the sulfide of the present invention, if used as a cathode active material, can solve these problems and make any of the solvents applicable, thus enhancing the selectivity of solvent used in the electrolyte.

The all-solid-state lithium secondary batteries (in particular, all-solid-state lithium secondary batteries) may also have the same structures as known all-solid-state lithium secondary batteries (in particular, all-solid-state lithium secondary batteries).

In this case, examples of usable electrolytes include polymer solid electrolytes, such as polyethylene oxide polymer compounds; polymer compounds comprising at least one member selected from the group consisting of polyorganosiloxane chains and polyoxyalkylene chains; sulfide solid electrolytes; oxide solid electrolytes; and the like.

The cathode for all-solid-state lithium secondary batteries (in particular, all-solid-state lithium secondary batteries) may have the same structures as known all-solid-state lithium batteries (in particular, all-solid-state lithium secondary batteries) except that the sulfide of the present invention is used as a positive active material. For example, a conductive agent, a binder, and a solid electrode are added to the sulfide of the present invention to prepare a cathode material mixture, and the cathode material mixture may be supported on a cathode current collector, such as aluminum, nickel, or stainless steel. Examples of conductive agents may be the same as those for non-aqueous solvent secondary batteries. For example, carbonaceous materials, such as graphite, cork, carbon black, and acicular carbon, can be used.

The non-aqueous electrolyte lithium batteries (in particular, non-aqueous electrolyte lithium secondary batteries) and the all-solid-state lithium secondary batteries (in particular, all-solid-state lithium secondary batteries) may also be of any shape, such as cylindrical or square.

EXAMPLES

The present invention is described below in more detail with reference to Examples, but is not limited to the Examples below.

(Lithium) Niobium Sulfide, (Lithium) Titanium Niobium Sulfide, and Titanium Niobium Sulfide Example 1: Synthesis of a-$NbS_3$ Powder In an argon-atmosphere glove box, a commercially available niobium sulfide ($NbS_2$) powder and a commercially available sulfur ($S_8$) powder were weighed so that these materials were mixed at an element ratio of Nb:S=1:3, and fed in an amount of 1.0 g in weight. The mixture was then subjected to mechanical milling with a ball mill (Fritsch P7) at 510 rpm for 20 to 100 hours using a 45-mL container containing about 500 zirconia balls with a diameter of 4 mm to obtain an amorphous $NbS_3$ powder. This amorphous $NbS_3$ powder had an impurity concentration of not more than 2 wt. %.

Example 2: Synthesis of a-$NbS_4$ Powder (No. 1)

In an argon-atmosphere glove box, a commercially available niobium sulfide ($NbS_2$) powder and a commercially available sulfur ($S_8$) powder were weighed so that these materials were mixed at an element ratio of Nb:S=1:4, and fed in an amount of 1.0 g in weight. The mixture was then subjected to mechanical milling with a ball mill (Fritsch P7) at 500 rpm for 90 hours using a 45-mL zirconia container containing about 500 zirconia balls with a diameter of 4 mm to obtain an amorphous $NbS_4$ powder. This $NbS_4$ amorphous powder had an impurity concentration of not more than 2 wt. %.

Example 3: Synthesis of a-$NbS_5$ Powder

In an argon-atmosphere glove box, a commercially available niobium sulfide ($NbS_2$) powder and a commercially available sulfur ($S_8$) powder were weighed so that these materials were mixed at an element ratio of Nb:S=1:3, and fed in an amount of 0.77 g in weight. The mixture was then subjected to mechanical milling with a ball mill (Fritsch P7) at 510 rpm for 40 hours using a 45-mL zirconia container containing about 500 zirconia balls with a diameter of 4 mm. Further, sulfur ($S_8$) powder was added to the zirconia pot at $NbS_3$:S=1:2, and the mixture was subjected to mechanical milling at 510 rpm for 36 hours to obtain an amorphous $NbS_5$ powder. This $NbS_5$ amorphous powder had an impurity concentration of not more than 2 wt. %.

Example 4: Synthesis of $NbS_5$ (a-$NbS_x$/$NbS_2$ Complex) Powder

In an argon-atmosphere glove box, a commercially available niobium sulfide ($NbS_2$) powder and a commercially available sulfur ($S_8$) powder were weighed so that these materials were mixed at an element ratio of Nb:S=1:5, and fed in an amount of 1.0 g in weight. The mixture was then subjected to mechanical milling with a ball mill (Fritsch P7) at 600 rpm for 60 hours using a 45-mL zirconia container containing about 500 zirconia balls with a diameter of 4 mm to obtain an amorphous $NbS_5$ (complex of amorphous $NbS_x$ and $NbS_2$) powder. This $NbS_5$ (complex of amorphous $NbS_x$ and $NbS_2$) powder had an impurity concentration of not more than 2 wt %. Although x in $NbS_x$ is not necessarily clear, it is estimated to be about 5<x<6.

Example 5: Synthesis of $NbS_5C_{2.3}$ (a-$NbS_x$/$NbS_2$/Acetylene Black Complex) Powder In an argon-atmosphere glove box, a commercially available niobium sulfide ($NbS_2$) powder, a commercially available sulfur ($S_8$) powder, and commercially available acetylene black were weighed so that these materials were mixed at an element ratio of Nb:S:C=1:5:2.3, and fed in an amount of 1.0 g in weight. The mixture was then subjected to mechanical milling with a ball mill (Fritsch P7) at 510 rpm for 60 hours using a 45-mL zirconia container containing about 500 zirconia balls with a diameter of 4 mm to obtain an amorphous $NbS_5C_{2.3}$ (complex of amorphous $NbS_x$, $NbS_2$, and C) powder. This $NbS_5C_{2.3}$ (amorphous complex of $NbS_x$, $NbS_2$, and C) powder had an impurity concentration of 2 wt. % or less. Although x in NbSx is not necessarily clear, it is estimated to be about 5<x<6.

Example 6: Synthesis of a-$Ti_{0.5}Nb_{0.5}S_3$ Powder

In an argon-atmosphere glove box, a commercially available titanium sulfide ($TiS_2$) powder, a commercially available niobium sulfide ($NbS_2$) powder, and a commercially available sulfur ($S_8$) powder were weighed so that these materials were mixed at an element ratio of Ti:Nb:S=1:1:6, and fed in a total amount of 1.0 g in weight. The mixture was then subjected to mechanical milling with a ball mill (Fritsch P7) at 370 rpm for 60 hours using a 45-mL zirconia container containing about 500 zirconia balls with a diameter of 4 mm to obtain an amorphous $Ti_{0.5}Nb_{0.5}S_3$ powder. The amorphous $Ti_{0.5}Nb_{0.5}S_3$ powder had an impurity concentration of not more than 2 wt. %.

Example 7: Synthesis of $Ti_{0.5}Nb_{0.5}S_4$ (a-$Ti_aNb_bS_c$/$NbS_2$ Complex) Powder In an argon-atmosphere glove box, a commercially available titanium sulfide ($TiS_2$) powder, a commercially available niobium sulfide ($NbS_2$) powder, and a commercially available sulfur ($S_8$) powder were weighed so that these materials were mixed at an element ratio of Ti:Nb:S=1:1:8, and fed in an amount of 1.0 g in weight. The mixture was then subjected to mechanical milling with a ball mill (Fritsch P7) at 370 rpm for 60 hours using a 45-mL zirconia container containing about 500 zirconia balls with a diameter of 4 mm to obtain a $Ti_{0.5}Nb_{0.5}S_4$ (amorphous complex of $Ti_aNb_bS_c$ and $NbS_2$) powder. This $Ti_{0.5}Nb_{0.5}S_4$ (amorphous complex of $Ti_aN_bS_c$ and $NbS_2$) powder had an impurity concentration of $NbS_2$ of not more than 2 wt. %. Although the a:b:c in $Ti_aNb_bS_c$ is not clear, it is estimated to be about 1:0.95 to 1:7.9 to 8.

Example 8: Synthesis of a-$NbS_{2.5}$ Powder

In an argon-atmosphere glove box, a commercially available niobium sulfide ($NbS_2$) powder and a commercially available sulfur ($S_8$) powder were weighed so that these materials were mixed at an elemental ratio of Nb:S=2:5, and fed in an amount of 1.0 g in weight. The mixture was then subjected to mechanical milling with a ball mill (Fritsch P7) at 370 rpm for 100 hours using a 45-mL zirconia container containing about 500 zirconia balls with a diameter of 4 mm to obtain an amorphous $NbS_{2.5}$ powder. This $NbS_2$ amorphous powder had an impurity concentration of not more than 2 wt. %.

Example 9: Synthesis of a-$Ti_{0.5}Nb_{0.5}S_{4.5}$ Powder

In an argon-atmosphere glove box, a commercially available titanium sulfide ($TiS_2$) powder, a commercially available niobium sulfide ($NbS_2$) powder, and a commercially available sulfur ($S_8$) powder were weighed so that these materials were mixed at an element ratio of Ti:Nb:S=1:1:9, and fed in an amount of 1.0 g in weight. The mixture was then subjected to mechanical milling with a ball mill (Fritsch P7) at 370 rpm for 100 hours using a 45-mL zirconia container containing about 500 zirconia balls with a diameter of 4 mm to obtain an amorphous $Ti_{0.5}Nb_{0.5}S_{4.5}$ powder. This amorphous $Ti_{0.5}Nb_{0.5}S_{4.5}$ powder had an impurity concentration of 2 wt. % or less.

Example 10: Synthesis of a-$Li_2NbS_3$ Powder

In an argon-atmosphere glove box, a commercially available lithium sulfide ($LiS_2$) powder, a commercially available niobium sulfide ($NbS_2$) powder, and a commercially available sulfur ($S_8$) powder were weighed so that these materials were mixed at an element ratio of Li:Nb:S=2:1:3, and fed in an amount of 1.5 g in weight. The mixture was then subjected to mechanical milling with a ball mill (Fritsch P7) at 510 rpm for 30 hours using a 45-mL zirconia container containing about 500 zirconia balls with a diameter of 4 mm to obtain an amorphous $NbS_4$ powder.

Example 11: Synthesis of a-$LiNbS_4$ Powder

In an argon-atmosphere glove box, a commercially available lithium sulfide ($LiS_2$) powder, a commercially available niobium sulfide ($NbS_2$) powder, and a commercially available sulfur ($S_8$) powder were weighed so that these materials were mixed at an element ratio of Li:Nb:S=1:1:4, and fed in an amount of 1.0 g in weight. The mixture was then subjected to mechanical milling with a ball mill (Fritsch P7) at 510 rpm for 45 hours using a 45-mL zirconia container containing about 500 zirconia balls with a diameter of 4 mm to obtain an amorphous $LiNbS_4$ powder.

Example 12: Synthesis of a-$NbS_4$ Powder (No. 2)

In an argon-atmosphere glove box, a commercially available niobium sulfide ($NbS_2$) powder and a commercially available sulfur ($S_8$) powder were weighed so that these materials were mixed at an element ratio of Nb:S=1:3, and fed in an amount of 1.3 g in weight. The mixture was then subjected to mechanical milling with a ball mill (Fritsch P7) at 510 rpm for 20 hours using a 45-mL zirconia container containing about 500 zirconia balls with a diameter of 4 mm to obtain an amorphous $NbS_3$ powder.

Subsequently, in the same argon-atmosphere glove box, the obtained amorphous $NbS_3$ powder and a commercially available sulfur ($S_8$) powder were weighed so that these materials were mixed at an element ratio of Nb:S=1:4, and fed in an amount of 1.5 g in weight. The mixture was then subjected to mechanical milling with a ball mill (Fritsch P7) at 510 rpm for 10 hours using a 45-mL zirconia container containing about 500 zirconia balls with a diameter of 4 mm to obtain an amorphous $NbS_4$ powder.

Comparative Example 1: $NbS_2$ Powder

A commercially available $NbS_2$ powder itself was used as a sample of Comparative Example 1.

Comparative Example 2: $TiS_2$ Powder

A commercially available $TiS_2$ powder itself was used as a sample of Comparative Example 2.

Comparative Example 3: Synthesis of a-TiS$_3$ Powder

In an argon-atmosphere glove box, a commercially available titanium disulfide (TiS$_2$) powder and a commercially available sulfur (S$_8$) powder were weighed so that these materials were mixed at an element ratio of Ti:S=1:3, and fed in an amount of 1.0 g in weight. The mixture was then subjected to mechanical milling with a ball mill (Fritsch P7) at 510 rpm for 40 hours using a 45-mL zirconia container containing about 500 zirconia balls with a diameter of 4 mm to obtain an amorphous TiS$_3$ powder.

Comparative Example 4: Synthesis of a-TiS$_4$ Powder

In an argon-atmosphere glove box, a commercially available titanium disulfide (TiS$_2$) powder and a commercially available sulfur (S$_8$) powder were weighed so that these materials were mixed at an element ratio of Ti:S=1:4, and fed in a total amount of 1.0 g in weight. The mixture was then subjected to mechanical milling with a ball mill (Fritsch P7) at 510 rpm for 40 hours using a 45-mL zirconia container containing about 500 zirconia balls with a diameter of 4 mm to obtain an amorphous TiS$_4$ powder.

Comparative Example 5: S$_8$ Powder

A commercially available S$_8$ itself was used as a sample of Comparative Example 5.

Comparative Example 6: Synthesis of Li$_2$NbS$_4$ Powder

In an argon-atmosphere glove box, a commercially available lithium sulfide (LiS$_2$) powder, a commercially available niobium sulfide (NbS$_2$) powder, and a commercially available sulfur (S$_8$) powder were weighed so that these materials were mixed at an element ratio of Li:Nb:S=2:1:4, and fed in an amount of 1.0 g in weight. The mixture was then subjected to mechanical milling with a ball mill (Fritsch P7) at 510 rpm for 40 hours using a 45-mL zirconia container containing about 500 zirconia balls with a diameter of 4 mm to obtain an amorphous Li$_2$NbS$_4$ powder.

Comparative Example 7: Synthesis of Li$_3$NbS$_4$ Powder

In an argon-atmosphere glove box, a commercially available lithium sulfide (LiS$_2$) powder, a commercially available niobium sulfide (NbS$_2$) powder, and a commercially available sulfur (S$_8$) powder were weighed so that these materials were mixed at an element ratio of Li:Nb:S=3:1:4, and fed in an amount of 1.0 g in weight. The mixture was then subjected to mechanical milling with a ball mill (Fritsch P7) at 51.0 rpm for 40 hours using a 15-mL zirconia container containing about 500 zirconia balls with a diameter of 4 mm to obtain an amorphous Li$_3$NbS$_4$ powder.

Synthesis of Comparative Example 8: NbS$_4$ Powder

In an argon-atmosphere glove box, a commercially available niobium sulfide (NbS$_2$) powder and a commercially available sulfur (S$_8$) powder were weighed so that these materials were mixed at an element ratio of Nb:S=1:4, and fed in an amount of 1.5 g in weight. The mixture was then subjected to mechanical milling with a ball mill (Fritsch P7) at 500 rpm for 90 hours using a 45-mL zirconia container containing about 500 zirconia balls with a diameter of 4 mm to obtain an amorphous NbS$_4$ powder.

Test Example 1: X-Ray Structure Diffraction (No. 1)

The amorphous NbS$_3$ powder obtained in Example 1, the amorphous NbS$_4$ powder obtained in Example 2, and the amorphous NbS$_5$ powder obtained in Example 3 were subjected to X-ray diffraction (XRD) measurement in the diffraction angle range of 2θ=10 to 80 using CuKα radiation. FIG. 1 shows the results. For references, FIG. 1 also shows the peaks of niobium sulfide (NbS$_2$) and sulfur (S$_8$) used as starting materials.

The X-ray diffraction diagram in FIG. 1 confirms a halo pattern or an extremely broad peak at a diffraction angle 2θ=15.0° in any of Examples 1 to 3. Even when the pattern is perceived as a peak, the half-width is much greater than 2°. No diffraction peaks are observed at diffraction angles 2θ=23.0°, 37.0°, and 40.0°. The results thus suggest that in Examples 1 to 3, neither crystalline NbS$_2$ nor S$_8$ remained, and an amorphous sulfide was obtained.

Subsequently, the NbS$_5$ (complex of amorphous NbS$_x$ and NbS$_2$) powder obtained in Example 4, and the NbS$_5$C$_{2.3}$ (complex of amorphous NbS$_x$, NbS$_2$, and C) powder obtained in Example 5 were subjected to X-ray diffraction (RD) measurement in the diffraction angle range of 2θ=10 to 50° using CuKα radiation. FIG. 2 shows the results. For reference, FIG. 2 also shows the peaks of niobium sulfide (NbS$_2$) and sulfur (S$_8$) used as starting materials.

The X-ray diffraction diagram in FIG. 2 shows that in Example 4, there are diffraction peaks of crystalline NbS$_2$ at diffraction angles 2θ=15.0°, 37.0°, and 40.0°. This result indicates that the crystalline NbS$_2$ used as a starting material remained. On the other hand, since no diffraction peak is observed at diffraction angle 2θ=23.0°, the results shows that S$_8$ did not remain, but formed a sulfide. This suggests that the sample of Example 4 is a complex of amorphous NbS$_x$ and NbS$_2$.

In Example 5, as in Example 4, diffraction peaks of crystalline NbS$_2$ are observed at diffraction angles 2θ=15.0°, 37.0°, and 40.0°, and no diffraction peak is observed at diffraction angle 2θ=23.0°. The results thus suggest that S$_8$ did not remain, but that crystalline NbS$_2$ remained. In Example 5, since acetylene black was used as a carbonaceous material, the sample of Example 5 is suggested to be a complex of amorphous NbS$_x$, NbS$_2$, and acetylene black.

Further, the amorphous Ti$_{0.5}$Nb$_{0.5}$S$_3$ powder obtained in Example 6, and the Ti$_{0.5}$Nb$_{0.5}$S$_4$ (complex of amorphous Ti$_a$Nb$_b$S$_c$ and NbS$_2$) powder obtained in Example 7 were subjected to X-ray diffraction (XRD) measurement in the diffraction angle range of 2θ=10 to 80° using CuKα radiation. FIG. 3 shows the results. For reference, FIG. 3 also shows peaks of niobium sulfide (NbS$_2$), titanium sulfide (TiS$_2$), and sulfur (S$_8$).

The X-ray diffraction diagram in FIG. 3 shows that in Example 6, there is a slight diffraction peak of NbS$_2$ at a diffraction angle 2θ=15.0°; however, the half-width is much broader than 0.3°, and the peak is weak. Further, no diffraction peaks are observed at diffraction angles 2θ=23.0°, 37.0°, and 40.0°. These results indicate that NbS$_2$ slightly remained but that it was almost completely consumed, and that S$_8$ was also almost completely consumed. It is thus suggested that a substantially amorphous Ti$_{0.5}$Nb$_{0.5}$S$_3$ powder was obtained.

In Example 7, diffraction peaks of $NbS_2$ are observed at diffraction angles $2\theta=15.0°$, $37.0°$, and $40.0°$. Their half-widths are much broader than $0.3°$, and the peaks are weak. No diffraction peak was observed at a diffraction angle $2\theta=23.0°$. Since these indicate that $NbS_2$ slightly remained and that $S_8$ was almost completely consumed, the results suggest that the sample of Example 7 formed a complex of amorphous $Ti_aNb_bS_c$ and $NbS_2$.

In the samples of Comparative Examples 3 and 4, no diffraction peaks were confirmed, and the results suggest that amorphous sulfides were obtained. FIG. 4 shows X-ray diffraction diagrams of Comparative Examples 3 and 4 measured in the diffraction angle range of $2\theta=10$ to $60°$ using CuKα radiation.

Measurement was made with all of the samples in the Examples being covered with a Kapton film to prevent air exposure. Therefore, a broad diffraction pattern derived from Kapton was confirmed around $2\theta=-10$ to $25°$.

Further, the amorphous $Li_2NbS_3$ powder obtained in Example 10, the amorphous $LiNbS_4$ powder obtained in Example 11, the $Li_2NbS_4$ powder obtained in Comparative Example 6, and the $Li_3NbS_4$ powder obtained in Comparative Example 7 were subjected to X-ray structure diffraction (XRD) in the diffraction angle range of $2\theta=25$ to $80°$ using CuKα radiation. FIG. 5 shows the results. For reference, FIG. 5 also shows the peaks of lithium sulfide, ($Li_2S$), niobium sulfide ($NbS_2$), and sulfur ($S_8$) used as starting materials.

The X-ray diffraction diagram in FIG. 5 confirms no clear peaks in any of Examples 10 and 11. The results thus suggest that none of crystalline $Li_2S$, $NbS_2$, and $S_8$ remained, and that an amorphous sulfide was obtained.

In contrast, in Comparative Examples 6 to 7, clear peaks with half-widths of $0.75°$ and $0.95°$ are observed around $34.7°$ and around $34.8°$, respectively. These peaks are attributable to crystalline $Li_3NbS_4$ and, no amorphous sulfide was obtained.

Further, the amorphous $NbS_4$ powder obtained in Example 12, and the $NbS_4$ powder obtained in Comparative Example 8 were subjected to X-ray structure diffraction (XRD) measurement in the diffraction angle range of $2\theta=10$ to $80°$ using CuKα radiation. FIG. 6 shows the results. For references, FIG. 6 also shows the peaks of niobium sulfide ($NbS_2$) and sulfur ($S_8$).

The X-ray diffraction diagram in FIG. 6 shows that in Example 12, there is a slight diffraction peak of $NbS_2$ at a diffraction angle $2\theta=15.0°$; however, the half-width is much broader than $0.3°$, and the peak is weak. Further, no diffraction peaks are observed at diffraction angles $2\theta=23.0°$, $37.0°$, and $40.0°$. These results indicate that $NbS_2$ slightly remained but was almost completely consumed, and that $S_8$ was also almost completely consumed.

In contrast, in Comparative Example 8, there is a clear diffraction peak of $NbS_2$ at diffraction angle $2\theta=15.0°$. Peaks are also observed at diffraction angles $2\theta=37.0°$ and $40.0°$. These peaks are attributable to crystalline $NbS_2$, and no amorphous sulfide was obtained.

Test Example 2: X-Ray Diffraction (with Addition of Si)

Whether the sulfide of the present invention is amorphous can be confirmed by mixing the sulfide with silicon (Si) and comparing the maximum peak intensity of the silicon.

Ten parts by weight of commercially available silicon (Si) was added per 100 parts by weight of each of the samples of Examples 3 to 4 and Comparative Examples 1 and 5. Each mixture was mixed using a mortar. Each mixture was subjected to X-ray structure diffraction (XRD) measurement in the diffraction angle range of $2\theta=10$ to $80°$ using CuKα radiation. FIG. 7 shows the results.

Table 1 shows the peak intensity ($I_{Si}$) at the maximum intensity position of the silicon used ($2\theta=28.5°$), the intensity ($I_{max}$) of each sample at the maximum intensity position of the obtained silicon mixture, and the ratio of these intensities ($I_{max}/I_{Si}$).

TABLE 1

| | Composition | $I_{Si}$ (28.5°) | $I_{max}$ | $I_{max}/I_{Si}$ |
|---|---|---|---|---|
| Example 3 | a-NbS$_5$ | 14500 | 4000 (14.7°) | 0.28 |
| Example 4 | NbS$_5$ (a-NbS$_x$/NbS$_2$complex) | 14500 | 14700 (14.9°) | 1.01 |
| Comparative Example 1 | NbS$_2$ | 13000 | 270000 (14.9°) | 20.8 |
| Compaxative Example 5 | S$_8$ | 12500 | 78500 (23°) | 6.28 |

This result, even when taking the peak intensities of Kapton used for preventing air exposure into consideration, indicates that compared with $NbS_2$ and $S_8$ used as starting materials, the materials used in the Examples had significantly reduced peak intensities. Measurement was made with each sample being covered with a Kapton film to prevent air exposure. Therefore, a broad diffraction pattern derived from Kapton was confirmed around $2\theta=10$ to $25°$.

Test Example 3: Transmission Electron Microscopy

The particle edges of the amorphous $NbS_2$ powder obtained in Example 3 and the $NbS_5C_{2.3}$ (complex of amorphous $NbS_x$, $NbS_2$, and C) powder obtained in Example 5 were observed under a transmission electron microscope (TEM). FIGS. 8 to 9 show the results. In order to avoid air exposure of the samples, an environmental control holder was used to introduce each sample into a TEM device from the argon atmosphere glove box.

The TEM image in FIG. 8 shows clear amorphization progress in Example 3. Since no clear crystal pattern is observed in the FFT pattern, the results suggest that no crystals having a long-range structure were present, and that a substantially completely amorphous powder was obtained.

In contrast, the TEM image in FIG. 9 shows that in Example 5, there are crystallites with an average crystallite size of about 1 to 20 nm in an amorphous matrix. This suggests that in Example 5, crystalline $NbS_2$ was present in an amorphous material as a matrix.

Test Example 4: Thermal Analysis

The sulfides of Examples 2, 3, 7, and 8 were subjected to differential scan calorimetric analysis (DSC) FIG. 10 shows the results. For comparison, FIG. 10 also shows the results of a mixture of crystalline $NbS_2$ and $S_8$ (the composition is $NbS_5$), crystalline $TiS_2$, and a mixture of crystalline $NbS_2$ and $S_8$ (the composition is $Ti_{0.5}Nb_{0.5}S_4$).

The results confirmed neither phase transition of $S_8$ nor an endothermic peak of melting in the sulfides of the Examples. In contrast, since elemental sulfur remained in the mixture with $S_8$, transition from the a phase (rhombic sulfur) at an onset temperature of about 100° C. to the β phase monoclinic sulfur), and an endothermic peak of melting of the β phase at an onset temperature of about 115° C. is observed.

In the mixture of crystalline $NbS_2$ and $S_8$, the heat of transition from the α phase to the β phase is 4.7 J/g, and the heat of fusion of the β phase is 20 J/g. In the mixture of the crystalline $TiS_2$, crystalline $NbS_2$, and $S_8$, the heat of transition from the α phase to the β phase is 3.9 J/g, and the heat of fusion of the β phase is 16.5 J/g.

Test Example 5: Electrical Conductivity 80 mg of each of powders of the samples obtained in Examples 1 to 11 and Comparative Examples 3 and 4 was placed in a tablet machine with a diameter of 10 mm, and uniaxially pressed at 25° C. and 360 MPa to obtain a sample for electrical conductivity measurement. Each sample was subjected to direct-current polarization measurement using a collector made of stainless steel to measure the electric resistance and calculate the electrical conductivity of the molded powder product.

Table 2 shows the results.

| | Composition | Electrical conductivity (Scm$^{-1}$) |
|---|---|---|
| Example 1 | a-$NbS_3$ | >1 |
| Example 2 | a-$NbS_4$ | $2.4 \times 10^{-3}$ |
| Example 3 | a-$NbS_5$ | $2.0 \times 10^{-4}$ |
| Example 4 | $NbS_5$ (a-$NbS_x$/$NbS_2$complex) | $2.0 \times 10^{-2}$ |
| Example 5 | $NbS_5C_{2.3}$ (a-$NbS_x$/$NbS_2$/acetylene black complex) | $6.0 \times 10^{-2}$ |
| Example 6 | a-$Ti_{0.5}Nb_{0.5}S_3$ | $2.0 \times 10^{-2}$ |
| Example 7 | $Ti_{0.5}Nb_{0.5}S_4$ (a-$Ti_aNb_bS_c$/$NbS_2$ complex) | $1.0 \times 10^{-2}$ |
| Example 8 | a-$NbS_{2.5}$ | >1 |
| Example 9 | a-$Ti_{0.5}Nb_{0.5}S_{4.5}$ | $1.0 \times 10^{-4}$ |
| Example 10 | a-$Li_2NbS_3$ | $3.5 \times 10^{-3}$ |
| Example 11 | a-$LiNbS_4$ | $9.0 \times 10^{-2}$ |
| Comparative Example 3 | a-$TiS_3$ | $1.5 \times 10^{-4}$ |
| Comparative Example 4 | a-$TiS_4$ | $8.6 \times 10^{-6}$ |

These results show that even when the sulfur content of the sulfides of the present invention was increased to improve the charge-discharge capacity, sufficient electrical conductivity was obtained.

Test Example 6: Charge-Discharge Test (No. 1)

Using the sulfides obtained in the above Examples 1 to 3, 5, 7 to 11 and Comparative Examples 1, 2, 6, and 7, two types of electrochemical cells were produced by the methods below. A galvanostatic charge-discharge test was performed at a current density of 10 mA/g in the cut-off voltage range of 1.5 to 3.0 V (however, in Comparative Example 6, the current density was set to 20 mA/g).

As a method for producing electrochemical cells (1) first, working electrodes were produced in the following manner. Acetylene black and polytetrafluoroethylene (PTFE) as a binder were added to the sulfides of the Examples and Comparative Examples to a weight ratio of sulfide powder: acetylene black:PTFE=8:8:8. After kneading with a mortar for 15 minutes, the resulting mixture was applied to an aluminum mesh to form a working electrode. Polypropylene was used as a separator, and lithium was used as a counter electrode. As an electrolyte, a solution of 1M lithium hexafluorophosphate ($LiPF_6$) in a mixed solvent of ethylene carbonate (EC) and dimethyl carbonate (DMC) at a weight ratio 1:1 (1M $LiPF_6$ EC/C) was used.

Electrochemical cells (2) were produced in the same manner as in the production of the electrochemical cells (1), except that the electrolyte was changed. Specifically, first, working electrodes were produced in the following manner. Acetylene black and polytetrafluoroethylene (PTFE) as a binder were added to the sulfides of the Examples and Comparative Examples to a weight ratio of sulfide powder: acetylene black:PTFE=84:8:8. After kneading with a mortar for 15 minutes, the resulting mixture was applied to an aluminum mesh to form a working electrode. Polypropylene was used as a separator, and lithium was used as a counter electrode. As the electrolyte, a solution of 1M lithium trifluoromethanesulfonylamide ($LiN(SO_2CF_3)_2$; LiTFSA) in a mixed solvent of 1,3-dioxolane (DOL) and 1,2-dimethoxyethane (DME) at a weight ratio 1:1 (1M LiTFSA DOL/DME) was used.

FIGS. 11 to 23 show the results. Each numerical value indicated in the figures shows the number of cycles.

The electrochemical cells used in each sample are as follows:

FIG. 11 (Example 1): electrochemical cells (1) and (2);
FIG. 12 (Example 2): electrochemical cell (1);
FIG. 13 (Example 3): electrochemical cell (1);
FIG. 14 (Example 5): electrochemical cell (1);
FIG. 15 (Example 7): electrochemical cell (1);
FIG. 16 (Example 8): electrochemical cells (1) and (2);
FIG. 17 (Example 9): electrochemical cell (1);
FIG. 18 (Example 10): electrochemical cell (1);
(FIG. 19: comparison of Examples 1 and 10);
FIG. 20 (Example 11): electrochemical cell (1);
FIG. 21 (Comparative Example 1): electrochemical cell (1);
FIG. 22 (Comparative Example 2): electrochemical cell (1);
FIG. 23 (Comparative Example 6): electrochemical cell (1); and
FIG. 24 (Comparative Example 7): electrochemical cell (1).

FIG. 11 shows that in charging and discharging in a cut-off voltage range of 1.5 to 3.0 V, the charging capacity (first cycle) was 268 mAh/g, and the discharging capacity (first cycle) was 281 mAh/g. Compared to the theoretical capacity of $NbS_3$ (one-electron reaction: 142 mAh/g, two electron-reaction: 283 mAh/g), two-electron reactions occurred in a seemingly targeted manner. The cycle characteristics were good.

Even when an ether solvent was used as the solvent, the charging capacity (first cycle) was 284 mAh/g, the charging capacity (second cycle) was 278 mAh/g, the discharging capacity (first cycle) was 342 mAh/g, and the discharging capacity (second cycle) was 301 mAh/g. The cells could be charged and discharged. With the use of an ether solvent, higher charging capacity and higher discharging capacity were obtained.

FIGS. 12, 13, and 16 show that even when a-$NbS_4$ powder, a-$NbS_5$ powder, and a-$NbS_{2.5}$ powder were used as niobium sulfides, the cells could be charged and discharged. Increasing the sulfur content slightly deteriorated the cycle characteristics, compared to that of a-$NbS_3$ powder, but significantly increased both the charging capacity and discharging capacity. In particular, when a-$NbS_5$ powder was used, about twice the capacity of a-$NbS_3$ powder was obtained.

FIG. 14 shows that even when crystalline $NbS_2$ and acetylene black were present, the cells could be charged and discharged. Compared to the a-$NbS_5$ powder, a further slightly enhanced capacity was obtained.

FIGS. 15 and 17 show that even when part of Nb was replaced with Ti, the cells could be charged and discharged. Compared to the a-NbS$_4$ powder, both the charging capacity and discharging capacity were significantly increased.

In contrast, FIGS. 21 and 22 show that when crystalline niobium sulfide and titanium sulfide were used together, extremely low capacity and low voltage (about 1.7 V) were obtained. The cycle characteristics were also not considered to be good.

FIGS. 18 to 20 show that the cells containing Li in the sulfides were also able to be charged and discharged. Further, compared to the a-NbS$_3$ powder, the average discharge potential was increased, while maintaining the charge-discharge capacity. Furthermore, capacity loss during charging and discharging was also reduced.

In contrast, FIGS. 23 and 24 show that when crystalline lithium niobium sulfide was used, charge-discharge capacity was slightly reduced, and energy loss during charging and discharging was great.

Using the sulfides obtained in Examples 1 to 2 and Comparative Examples 3 to 4, electrochemical cells (1) were produced by the method below in the same manner as above. A galvanostatic charge and discharge test was performed for twenty cycles at a current density of 10 mA/g in the cut-off voltage range of 1.5 to 3.0 V. FIGS. 25 to 27 show the results.

Regardless of the comparison between materials having similar composition ratios and between materials having similar initial capacities, the sulfide of the present invention is shown to have better cycle characteristics than conventional titanium sulfides.

When elemental sulfur is used as a cathode, it is difficult to use with a carbonate solvent. This is because elemental sulfur, or a charge-discharge product of elemental sulfur, reacts with the solvent. When elemental sulfur is used as a cathode, it is possible to perform charging and discharging with the use of an ether solvent. However, a large amount of a sulfur component is dissolved into an electrolyte during charging and discharging, which leads to performance degradation.

When the sulfide of the present invention was used, charging and discharging could be performed with the use of any of the carbonate solvent and ether solvent. Considering this, as well as the fact that good cycle characteristics were obtained, the results suggest that a side reaction between sulfur and the carbonate solvent was inhibited. Even when an ether solvent was used, coloring of the electrolyte after the charge and discharge test was greatly reduced. This result indicates that elution of a sulfur component was inhibited.

Since this effect can be expected to be produced by the mere presence of the sulfide of the present invention in the portion in contact with the solvent, an active material containing the sulfide of the present invention has excellent characteristics.

(Lithium) Manganese Sulfide or Iron Sulfide

Comparative Example 9: Synthesis of MnS$_3$ Powder

In an argon-atmosphere glove box, a commercially available manganese sulfide (MnS) powder and a commercially available sulfur (S$_8$) powder were weighed so that these materials were mixed at an element ratio of Mn:S=1:3, and fed in an amount of 1.4 g in weight. The mixture was then subjected to mechanical milling with a ball mill (Fritsch P7) at 510 rpm for 80 hours using a 45-mL zirconia container containing about 500 zirconia balls with a diameter of 4 mm to obtain an amorphous MnS$_3$ powder.

Comparative Example 10: Synthesis of Li$_2$MnS$_3$ Powder

In an argon-atmosphere glove box, a commercially available lithium sulfide (LiS$_2$) powder, a commercially available manganese sulfide (MnS) powder, and a commercially available sulfur (S$_8$) powder were weighed so that these materials were mixed at an element ratio of Li:Mn:S=2:1:3, and fed in an amount of 1.5 g in weight. The mixture was then subjected to mechanical milling with a ball mill (Fritsch P7) at 510 rpm for 80 hours using a 45-mL zirconia container containing about 500 zirconia balls with a diameter of 4 mm to obtain an amorphous LiSMnS$_3$ powder.

Comparative Example 11: Synthesis of FeS$_4$ Powder (No. 1)

In an argon-atmosphere glove box, a commercially available iron sulfide (FeS$_2$) powder and a commercially available sulfur (S$_8$) powder were weighed so that these material were mixed at an element ratio of Fe:S=1:4, and fed in an amount of 1.0 g in weight, thus obtaining a FeS$_4$ powder.

Comparative Example 12: Synthesis of FeS$_4$ Powder (No. 2)

In an argon-atmosphere glove box, a commercially available iron sulfide (FeS$_2$) powder and a commercially available sulfur (S$_3$) powder were weighed so that these materials were mixed at an element ratio of Fe:S=1:4, and fed in an amount of 1.0 g in weight. The mixture was then subjected to mechanical milling with a ball mill (Fritsch P7) at 360 rpm for 40 hours using a 45-mL zirconia container containing about 500 zirconia balls with a diameter of 4 mm to obtain an amorphous FeS$_4$ powder.

Test Example 7: X-Ray Structure Diffraction (No. 2)

The MnS$_3$ powder obtained in Comparative Example 9, Li$_2$MnS$_3$ powder obtained in Comparative Example 10, FeS$_4$ powder obtained in Comparative Example 11, and FeS$_4$ powder obtained in Comparative Example 12 were subjected to X-ray diffraction (XRD) measurement in the diffraction angle range of 2θ=10 to 80° (however, the diffraction angle range was 2θ=10 to 60° in Comparative Examples 2 and 13). FIGS. 28 and 29 show the results. For reference, FIG. 28 also shows the peaks of manganese sulfide (MnS), lithium sulfide (Li$_2$S), and sulfur (S$_8$) used as starting materials. FIG. 29 also shows the peaks of iron sulfide (FeS$_2$) and sulfur (S$_8$) used as starting materials.

The X-ray diffraction diagram in FIG. 28 shows that in both Comparative Example 10 and Comparative Example 11, there are clear peaks, indicating MnS, at diffraction angles 2θ=33.9°, 49.3°, and 61.1°. In Comparative Example 10, a peak indicating S$_8$ is also observed at a diffraction angle 2θ=23.0°. These results show that when (lithium) manganese sulfides were used, no amorphous sulfides were obtained, even by mechanical milling.

In contrast, the X-ray diffraction diagram in FIG. 29 shows that in both of Comparative Example 12 and Comparative Example 13, there are clear peaks, indicating FeS$_2$ and S$_8$, at diffraction angles 2θ=28.50°, 32.9°, 37.0°, 40.6°, and 23.0° These results show that when iron sulfides were used, no amorphous sulfides were obtained, even by mechanical milling.

Test Example 8: Charge-Discharge Test (No. 2)

Using the sulfide obtained in Comparative Example 12, electrochemical cells were produced by the method below. A galvanostatic charge-discharge test was performed at a current density of 5 mA/g in the cut-off voltage range of 1.5 to 3.0 V.

As a method for producing electrochemical cells, first, working electrodes were produced in the following manner. Acetylene black and polytetrafluoroethylene (PTFE) as a binder were added to the sulfide of each Comparative Example to a weight ratio of sulfide:acetylene black: PTFE=84:8:8. After kneading with a mortar for 15 minutes, the resulting mixture was applied to an aluminum mesh to form a working electrode. Polypropylene was used as a separator, and lithium was used as a counter electrode. As the electrolyte, a solution of 1M lithium hexafluorophosphate (LiPF$_6$) in a mixed solvent of ethylene carbonate (EC) and dimethyl carbonate (DMC) at a weight ratio 1:1 (1M LiPF$_6$EC/DMC) was used.

FIG. 30 shows the results.

We claim:

1. A sulfide comprising an amorphous (lithium) niobium sulfide having an average composition represented by formula (1):

$$Li_{k1}NbS_{n1}$$

wherein 0≤k1≤1.5; 3.5≤n1≤10, or
an amorphous (lithium) titanium niobium sulfide having an average composition represented by formula (2):

$$Li_{k2}Ti_{1-m2}Nb_{m2}S_{n2}$$

wherein the formula (2) satisfies (i) or (ii) below,
(i) 0≤k2≤5; 0<m2<1; and 3≤n2≤3.5, or
(ii) 0≤k2≤5; 0<m2<1; and 3.5≤n2≤10.

2. The sulfide according to claim 1, wherein the sulfide has an impurity concentration of not more than 2 wt. %.

3. A sulfide comprising an amorphous sulfide having an average composition represented by a formula:

$$Li_{k3}Ti_{1-m3}Nb_{m3}S_{n3}$$

wherein 0≤k3≤1.5; 0<m3≤1; 3.5≤n3≤10,
the sulfide having an impurity concentration of not more than 2 wt. %.

4. The sulfide according to claim 1, wherein the amorphous (lithium) niobium sulfide or the amorphous (lithium) titanium niobium sulfide is present as a matrix, and the sulfide further comprises a crystalline metal sulfide that is present in the matrix.

5. The sulfide according to claim 1, wherein in an X-ray diffraction diagram obtained using CuKα radiation, the sulfide has a half-width of 0.3° or more at diffraction angles 2θ=15.0±0.5°, 15.5±0.5°, and 23.0±0.5°, or has no diffraction peaks at diffraction angles 2θ=15.0±0.5°, 15.5±0.5°, and 23.0±0.5°.

6. The sulfide according to claim 1, wherein the sulfide contains no crystallites, or has an average crystallite size of 5 nm or less.

7. A sulfide comprising:
an amorphous (lithium) niobium sulfide or an amorphous (lithium) titanium niobium sulfide as a matrix; and
a crystalline metal sulfide or carbon that is present in the matrix,
wherein the sulfide has an average composition represented by a formula:

$$Li_{k4}Ti_{1-m4}Nb_{m4}S_{n4}C_x$$

wherein 0≤k4≤1.5; 0<m4≤1; 3.5n4≤10; 0≤x≤10.

8. The sulfide according to claim 7, wherein in an X-ray diffraction diagram obtained using CuKα radiation, the amorphous (lithium) niobium sulfide or amorphous (lithium) titanium niobium sulfide has a half-width of 0.3° or more at diffraction angles 2θ=15.0±0.5°, 15.5±0.5°, and 23.0±0.5°, or has no diffraction peaks at diffraction angles 2θ=15.0±0.5°, 15.5±0.5°, and 23.0±0.5°.

9. The sulfide according to claim 7, wherein the amorphous (lithium) niobium sulfide or amorphous (lithium) titanium niobium sulfide contains no crystallites, or has an average crystallite size of 5 nm or less.

10. A method for producing the sulfide according to claim 1 comprising mechanically milling a starting material, wherein the starting material comprises a niobium-containing material and a sulfur-containing material.

11. The method according to claim 10, wherein the starting material comprises at least one of crystalline niobium sulfide, amorphous (lithium) niobium sulfide, and amorphous (lithium) titanium niobium sulfide.

12. The method according to claim 11, wherein the starting material further comprises sulfur.

13. The method according to claim 10, wherein the starting material further comprises at least one of a titanium-containing material, a lithium-containing material, and a carbonaceous material.

14. The method according to claim 13, wherein the titanium-containing material is titanium sulfide, and the lithium-containing material is lithium sulfide.

15. A charge-discharge product of the sulfide according to claim 1.

16. A cathode active material for lithium batteries comprising the sulfide according to claim 1.

17. An electrode for lithium batteries comprising the cathode active material for lithium batteries according to claim 16.

18. The electrode for lithium batteries according to claim 17, wherein the electrode is a cathode for lithium batteries.

19. A lithium battery comprising the electrode for lithium batteries according to claim 17.

20. The lithium battery according to claim 19, wherein the lithium battery is a non-aqueous electrolyte battery or an all-solid-state battery.

* * * * *